(12) United States Patent
Ka et al.

(10) Patent No.: US 7,515,707 B2
(45) Date of Patent: *Apr. 7, 2009

(54) PORTABLE APPARATUS HAVING TWO ROTATABLE AND FOLDABLE UNITS AND HINGE DEVICE USED FOR THE SAME

(75) Inventors: Sung-Hyun Ka, Gunpo-Si (KR); Young-Ju Lee, Gunpo-Si (KR); Hochan Song, Concord, NH (US)

(73) Assignee: Amphenol Phoenix Co., Ltd. (KR)

( * ) Notice: Subject to any disclaimer, the term of this patent is extended or adjusted under 35 U.S.C. 154(b) by 816 days.

This patent is subject to a terminal disclaimer.

(21) Appl. No.: 11/084,433

(22) Filed: Mar. 18, 2005

(65) Prior Publication Data

US 2005/0236869 A1   Oct. 27, 2005

(30) Foreign Application Priority Data

| Apr. 9, 2004 | (KR) | ................................ 2004-24563 |
| May 19, 2004 | (KR) | ................................ 2004-35744 |
| Jun. 21, 2004 | (KR) | ................................ 2004-46166 |
| Sep. 24, 2004 | (KR) | ...................... 10-2004-0077044 |
| Dec. 22, 2004 | (KR) | ................................ 2004-110292 |
| Dec. 22, 2004 | (KR) | ................................ 2004-110293 |

(51) Int. Cl.
*H04M 1/00* (2006.01)
*H04M 9/00* (2006.01)
*E05D 3/06* (2006.01)

(52) U.S. Cl. ................. 379/433.12; 379/433.13; 455/575.3; 455/575.4; 16/366

(58) Field of Classification Search ............ 379/433.11, 379/433.12, 433.13; 455/575.1, 575.3, 575.4, 455/90.3; 16/277, 287, 327, 357, 336, 366; 361/680–683
See application file for complete search history.

(56) References Cited

U.S. PATENT DOCUMENTS

| 5,732,331 | A | * | 3/1998 | Harms | ...................... 455/575.3 |
| 6,009,568 | A | * | 1/2000 | Miyazaki | ...................... 4/236 |
| 6,085,387 | A | | 7/2000 | Han | |
| 6,115,886 | A | * | 9/2000 | Fujita | ........................... 16/330 |
| 6,434,404 | B1 | | 8/2002 | Claxton et al. | |
| 7,171,247 | B2 | * | 1/2007 | Han | ........................ 455/575.3 |

* cited by examiner

*Primary Examiner*—Curtis Kuntz
*Assistant Examiner*—Tuan D Nguyen
(74) *Attorney, Agent, or Firm*—Knobbe, Martens Olson & Bear LLP

(57) ABSTRACT

A portable apparatus of the present invention comprises a first unit, a second unit, and a hinge device that is coupled to the first and second units such that the units can be moved to be in contact with or spaced apart from each other and allows relative sliding movement between the first and second units within a certain range. The hinge device exerts a force in a direction in which the first and second units are spaced apart from each other, through the relative sliding movement by a predetermined distance between the two units in the complete contact state of the first and second units.

42 Claims, 31 Drawing Sheets

(a)

(b)

(c)

(a)

(b)

(c)

(a)

(b)

(c)

PORTABLE APPARATUS HAVING TWO ROTATABLE AND FOLDABLE UNITS AND HINGE DEVICE USED FOR THE SAME

BACKGROUND OF THE INVENTION

1. Field of the Invention

The disclosure relates to a portable apparatus having two panels movable between open and closed positions.

2. Description of the Related Art

A portable apparatus such as a portable folder-type radiotelephone includes two case units coupled to each other such that they can be moved to folded and unfolded positions of the apparatus with respect to each other, and a hinge device for coupling the two case units to each other. One case unit is provided with a keypad with buttons, and the other case unit is provided with a liquid crystal display. When the portable apparatus is in use, the keypad and the liquid crystal display are moved to the unfolded position of the portable apparatus so that the keypad and display can be exposed to the outside. The hinge device allows the two case units to be coupled to each other and to be smoothly moved to the folded and unfolded positions of the portable apparatus.

A typical portable apparatus is constructed such that when two case units thereof are spaced apart by a predetermined angular distance from each other, they are then automatically moved to an unfolded position of the portable apparatus. An example of a hinge device used for such a portable apparatus includes a hinge device disclosed in Korean Patent No. 266516 (corresponding to U.S. Pat. No. 6,085,387). The hinge device comprises a rotating member, a linearly moving member, a resilient member, and a housing. The housing contains the rotating member, the linearly moving member and the resilient member. The rotating member can rotate about a rotation axis within the housing, and a portion of the rotating member extending along the rotation axis protrudes outside of the housing to form a coupling portion (coupling shaft). The linearly moving member is in contact with the rotating member, and does not rotate within the housing but moves linearly along the rotation axis of the housing. The resilient member applies a force so that the linearly moving member and the rotating member can be brought into close contact with each other within the housing. At this time, contact surfaces of the linearly moving member and the rotating member are properly configured such that the rotating member easily rotates even without an external force in a certain range and is well maintained in a stationary state at a predetermined location.

One of two case units of a portable apparatus that are intended to be coupled to the hinge device constructed as above is fixed to the housing while the other is fixed to the coupling shaft of the rotating member. When the two case units are spaced apart beyond a predetermined angle from each other from a completely folded state of the portable apparatus, the two case units are automatically moved to an unfolded state of the portable apparatus through the operation of the hinge device. Therefore, in order to unfold the portable apparatus, a user should initially apply an external force to the two case units such that they can be moved with respect to each other. However, it is inconvenient for the user to apply the external force with only one hand. This is because the user should insert his/her finger between the two case units where there is no clearance and subsequently move them to be spaced apart from each other. Otherwise, the user should use his/her both hands. Accordingly, there is a need for a portable apparatus with two units, which has a structure for allowing a user to more conveniently cause the two units to be spaced apart from each other to unfold the apparatus.

SUMMARY OF THE INVENTION

One aspect of the invention provides a portable device, which comprises a first panel comprising a first surface; a second panel comprising a second surface; and a connector connecting the first panel and second panel. The connector is configured to rotatably connect the first panel and second panel relative to each other, in which the second panel being rotatable about a panel rotating axis between a first rotational position and a second rotational position. The first and second surfaces face each other and being substantially parallel to each other when the second panel is in first rotational position. The connector is further configured to further slidably connect the first panel and second panel relative to each other, in which the second panel or a portion thereof being substantially linearly movable between a first linear position and a second linear position when the second panel is in the first rotational position. The connector is further configured to actuate rotation of the second panel from the first rotational position toward the second rotational position about the panel rotating axis when the second panel or the portion thereof is in the second linear position.

A further aspect of the invention provides a connector for connecting a first panel and a second panel. Also, the connector can be used as a part of the portable device. In some embodiments, the connector comprises a hinge device, which comprises: a cam, a cam follower and a coupler. The cam has a cam surface, which comprises a first spontaneous moving section. The cam follower is in contact with the cam surface at a contact point. The cam follower is spontaneously rotatable in a first rotational direction about a hinge axis relative to the cam surface when the contact point is located on the first spontaneous moving section. One of the cam and cam follower is substantially non-rotatable relative to the second panel, and the other is rotatable about the hinge axis relative to the second panel as the cam and the cam follower rotates relative to each other. The coupler is connected to the cam or cam follower, in which the coupler rotatable about the hinge axis relative to the second panel as the cam and cam follower rotate relative to each other, the coupler being substantially linearly non-movable relative to the second panel.

The cam surface further comprises a second spontaneous moving section. The cam follower is spontaneously rotatable in a second rotational direction about the hinge axis relative to the cam surface when the contact point is located on the second spontaneous moving section, and the second rotational direction is substantially opposite to the first rotational direction. The cam surface further comprises a peak, which comprises a highest point of the peak and two sloping surfaces next to the highest point of the peak, and the first spontaneous moving section comprises one of the sloping surfaces. The cam surface further comprises a first valley, a first peak and a second valley, and wherein the first spontaneous moving section comprises an area between the first valley and the first peak. When the second panel or the portion thereof is in the second linear position, the contact point is located on the first spontaneous moving section. When the contact point is located on the first spontaneous section, the cam follower begins to rotate about the hinge axis in the first rotational direction relative to the cam surface. When the cam follower rotates about the hinge axis in the first rotational direction relative to the cam surface, the second panel begins to rotate about the panel rotating axis in a rotational direction toward the second rotational position. The coupler is connected to the first panel and is rotatable about the hinge axis relative to the first panel.

The connector comprises a coupler receiver non-movably connected to the first panel. The coupler receiver is configured to receive the coupler while allowing a substantially linear movement of the coupler relative to the first panel from a first coupler position to a second coupler position. The coupler and the coupler receiver are configured such that the substantially linear movement of the coupler relative to the first panel actuates rotation of the coupler about the hinge axis. The coupler comprises a pinion, and the coupler receiver comprises a rack engaged with the pinion. The coupler has a cross-sectional shape taken in a plane substantially perpendicular to the hinge axis, wherein the coupler receiver comprises a guide groove configured to receive and rotate the cross-sectional shape as the cross-sectional shape linearly moves within the guide groove. When the coupler is in the first coupler position, the second panel or the portion thereof is in the first linear position. When the coupler is in the second coupler position, the second panel or the portion is in the second linear position.

The connector further comprises a spring configured to apply a force to the coupler in a direction toward the first coupler position. The connector is further configured to allow rotation of the second panel about a twisting axis relative to the first panel between a first twisting position and a second twisting position. The twisting axis is substantially perpendicular to at least one of the first and second surfaces. When the second panel is in the first twisting position, the second panel or the portion is in the first linear position. When the second panel is in the second twisting position, the second panel or the portion is in the second linear position. The connector further comprises a shaft projecting from one of the first and second panels. The connector further comprises a receiving hole of the tapering rod formed in the other of the first and second panels. The shaft has a distal end and a proximal end, and wherein the proximal end is thicker than the distal end in a cross-section of the shaft taken in a plane substantially parallel to the first surface when the second panel is in the first rotational position. The connector comprises a shaft connected to the first panel and the second panel. The shaft is rotatable about an axis relative to the second panel and linearly movable relative to the second panel between a first shaft position and a second shaft position. The shaft is rotatable about the axis relative to the first panel and substantially linearly non-movable relative to the first panel. The connector further comprises a shaft receiver attached to the second panel. The shaft receiver is configured to receive the shaft while allowing a substantially linear movement of the shaft relative to the second panel from the first position to the second shaft position. The shaft and the shaft receiver are configured such that the substantially linear movement of the shaft relative to the second panel actuates rotation of the shaft about the hinge axis.

In some embodiments, the connector comprises: a housing, a first hinge unit and a second hinge unit. The first hinge unit is substantially enclosed within the housing. The first hinge unit comprises a first coupler rotatable about a first hinge axis relative to the housing. The first coupler is substantially coupled with the first panel. The second hinge unit substantially enclosed within the housing. The second hinge unit comprises a second coupler rotatable about a second hinge axis relative to the housing. The second coupler is substantially coupled with the second panel. The first coupler is rotatable about the first hinge axis relative to the housing through an angle less than about 90°. The angle is less than about 75°. The angle is less than about 50°. At least one of the first and second couplers projects out of the housing. At least one of the first and second couplers is enclosed within the housing and coupled with the corresponding one of the first and second panels within the housing. The second coupler is rotatable about the second hinge axis relative to the housing for an angle from less than 90° to more than 90°. The second coupler is rotatable about the second hinge axis relative to the housing for an angle from about 120° to about 200°.

The first hinge unit comprises: a first cam, a first cam follower and a resilient member. The first cam has a cam surface which comprises a valley. The valley comprises a lowest point of the valley and two sloping surfaces next to the lowest point of the valley. The first cam follower is in contact with the first cam surface and being rotatable relative to the first cam surface about the first hinge axis. The resilient member applies a force to keep the cam follower in contact with the cam surface. The force further rotates the cam follower about the hinge axis relative to the cam surface when the first cam follower contacts one of the two sloping surfaces. The first coupler of the connector is connected to the first cam or the first cam follower and configured to rotate about the first hinge axis when the first cam follower and the first cam surface rotate about the hinge axis relative to each other. The first cam follower contacts the cam surface only within the valley.

The second hinge unit comprises: a second cam, a second cam follower and a resilient member. The second cam has a second cam surface, which comprises a first valley, a first peak and a second valley. The second cam follower is in contact with the second cam surface at a second contact point and rotatable relative to the second cam surface about the second hinge axis. The resilient member applies a force to keep the cam follower in contact with the cam surface. The force further rotates the cam follower about the hinge axis relative to the cam surface when the contact point is located between the first valley and first peak or between the first peak and the second valley. The second coupler of the connector is connected to the second cam or the second cam follower and configured to rotate about the second hinge axis when the second cam follower and the second cam surface rotate about the hinge axis relative to each other. The first rotational position of the second panel is a closed configuration of the device. The second rotational position of the second panel is an open configuration of the device. At least one of the first and second panels comprises an information display screen. At least one of the first and second panels comprises buttons for inputting information.

Another aspect of the invention provides a portable device, comprising: a first panel comprising a first surface; a second panel comprising a second surface; means for rotatably connecting the first panel the and second panel so that the second panel is rotatable about an axis between a first rotational position and a second rotational position, wherein the first and second surfaces face each other and being substantially parallel to each other when the second panel is in the first rotational position; and means for slidably connecting the first panel and the second panel so that the second panel or a portion thereof is substantially linearly movable between a first linear position and a second linear position when the second panel is in the first rotational position. The means for rotatably connecting the first and second panels actuates rotation of the second panel from the first rotational position toward the second rotational position when the second panel or the portion thereof is in the second linear position.

Another aspect of the invention provides a method of operating the portable device. The method comprises: substantially linearly moving the second panel or the portion thereof relative to the first panel from the first linear position to the second linear position when the second panel is in the first rotational position; and actuating rotation of the second panel by the connector from the first rotational position to the second rotational position when the portion of the second panel is in the second linear position.

A further aspect of the invention provides a connector for connecting a first panel having a first surface and a second panel having a second surface. The connector comprises: means for rotatably connecting the first panel and the second panel so that the second panel is rotatable about an axis between a first rotational position and a second rotational position, wherein the first and second surfaces face each other and being substantially parallel to each other when the second panel is in the first rotational position; and means for slidably connecting the first and second panel so that the second panel or a portion thereof is substantially linearly movable between a first linear position and a second linear position when the second panel is in the first rotational position. The means for rotatably connecting the first and second panels actuates rotation of the second panel from the first rotational position toward the second rotational position when the second panel or the portion thereof is in the second linear position.

A further aspect of the invention provides a hinge device, comprising: a housing, a first hinge unit and a second hinge unit, the features of which are described above in connection with other aspect of the invention.

According to an aspect of the present invention, there is provided a hinge device for connecting first and second units to be coupled such that the units can be moved toward and far away from each other, comprising a first rotating member coupled to the first unit to rotate about a first rotation axis; a first contact member coming into contact with the first rotating member; a first resilient member for applying a force to maintain a state where the first rotating member and the first contact member are in contact with each other; a second rotating member coupled to the second unit to rotate about a second rotation axis substantially parallel to the first rotation axis; a second contact member coming into contact with the second rotating member; and a second resilient member for applying a force to maintain a state where the second rotating member and the second contact member are in contact with each other. Here, one of the first rotating member and the first contact member has a first cam portion and the other thereof has a first cam follower portion that comes into contact and cooperates with the first cam portion. One of the second rotating member and the second contact member has a second cam portion and the other thereof has a second cam follower portion that comes into contact and cooperates with the second cam portion. The first cam portion comprises a first slanted surface and a second slanted surface inclined in a direction opposite to that of the first slanted surface, and the first rotating member can be automatically rotated with cooperation of the two slanted surfaces and the first cam follower portion for causing them to be maintained in a contact state. The second cam portion comprises a third slanted surface with which the second cam follower portion comes into contact, and the third slanted surface is inclined in the same direction as the first slanted surface with respect to an identical rotation direction. The first cam follower portion is moved from the first slanted surface to the second slanted surface while the second cam follower portion is moved in a direction ascending along the third slanted surface.

In the hinge device, the first contact member may be linearly moved along the first rotation axis to function as a linearly moving member, and the second contact member may be linearly moved along the second rotation axis to function as a linearly moving member.

In the hinge device, the slope of the second slanted surface of the first cam portion may be gentler than that of the third slanted surface of the second cam portion.

In the hinge device, the second slanted surface of the first cam portion may be provided with a fixing groove into which the first cam follower portion is fitted and secured.

In the hinge device, wall surfaces for preventing the movement of the second cam follower portion may be formed at both sides of the third slanted surface of the second cam portion.

In the hinge device, a valley may be formed at a lowermost end of the third slanted surface of the second cam portion.

The hinge device may further comprise a case for accommodating the first and second rotating members, the first and second contact members, and the first and second resilient members therein.

In the hinge device, the case may have a passage through which a wire for electrically connecting the first and second units to each other.

The hinge device may further comprise a first hinge module with a first housing for accommodating the first rotating member, the first contact member and the first resilient member therein, and a second hinge module with a second housing for accommodating the second rotating member, the second contact member and the second resilient member therein. The first and second hinge modules may be inserted into and coupled to the case.

According to another aspect of the present invention, there is provided a portable apparatus, comprising a first unit with a substantially flat first surface; a second unit with a substantially flat second surface to be in contact with the first surface; and a hinge device coupled to the first and second units such that the first and second units can be moved to cause the first and second surfaces to face each other or to be spaced apart from each other. The hinge device allows relative sliding movement to be established between the first and second units at a certain range in the state where the two units are in contact with each other. The hinge device includes a rotating member connected to one of the first and second units. The rotating member has a range for automatic rotation in a direction in which the first and second units are spaced apart from each other. If the rotating member enters the automatic rotation range due to the relative sliding movement by a predetermined distance between the two units from the complete contact state of the first and second units, the hinge device exerts a force in the direction in which the first and second units are spaced apart from each other.

According to a further aspect of the present invention, there is provided a method of using a portable apparatus including two units movable to be in contact with each other or to be spaced apart from each other, and a hinge device that connects the two units and includes a rotating member coupled to any one of the two units and having a range for automatic rotation in a direction in which the two units are spaced apart from each other, comprising the steps of causing the rotating member to enter the automatic rotation range by slidably moving the two units with respect to each other in a completely folded state of the portable apparatus; and automatically moving the two units to be spaced apart from each other by removing an external force for the sliding movement and by causing the rotating member to be automatically rotated without an external force in the automatic rotation range.

The method may further comprise the step of allowing the two units to be automatically spaced apart from each other and fixing them in a state where the two units are spaced apart from each other at a predetermined angle.

The method may further comprise the step of limiting the relative sliding movement of the two units.

According to a still further aspect of the present invention, there is provided a rotating device for use with a portable apparatus having first and second units relatively rotatable to be in contact with or spaced apart from each other so as to provide rotation between the two units, comprising a track provided in the first unit; a hinge device that includes a rotating member with a coupling shaft movably fitted into the track and is mounted in the second unit; and a first resilient member provided in the first unit for applying a force to move the coupling shaft toward one side in the track. The hinge device includes a contact member coupled to the second unit to cooperate with the rotating member in a contact state therewith, and a second resilient member for applying a force in a direction causing the contact member to be in contact with the rotating member.

In the rotating device, one of the rotating member and the contact member of the hinge device may be provided with a cam follower portion, and the other thereof may be provided with a cam portion that cooperates with the cam follower portion and has a first slanted surface and a second slanted surface inclined in a direction opposite to that of the first slanted surface. As the coupling shaft is moved along the track, the rotating member may be rotated and the cam follower portion may be moved between the first and second slanted surfaces.

In the rotating device, the rotating member of the hinge device may be provided with a pinion, and the first unit may be provided with a rack cooperating with the pinion.

In the rotating device, if the pinion is rotated through the cooperation thereof with the rack such that the coupling shaft is moved within the track in a direction for resisting an elastic force of the first resilient member, the cam follower portion may be moved from one of the slanted surfaces of the cam portion to the other slanted surface.

In the rotating device, the rotating member of the hinge device may have a cylindrical coupling post, and the rotating device may further comprise a pressing member of which one side is in contact with the first resilient member and the other side is in contact with the coupling post.

In the rotating device, the hinge device may further comprise a housing for accommodating the contact member and the second resilient member therein.

In the rotating device, the track may comprise first and second paths connected to each other, and upon movement of the coupling shaft between the first and second paths, the rotating member may be rotated and the cam follower portion may be moved between the first and second slanted surfaces.

In the rotating device, the first and second paths of the track may be provided such that the second path is followed by the first path according to a direction in which the first resilient member pushes the coupling shaft. The second path may extend along a direction in which the first unit is slidably moved with respect to the second unit in the complete contact state of the first and second units. The first path may extend from the second path after being bent in a direction in which the first path is far away from the second unit.

In the rotating device, the coupling shaft may comprise a key plane and a semicircular circumference.

In the rotating device, the second path of the track may extend longer than a diameter of the coupling shaft, and the first path may extend by a radius of the coupling shaft.

In the rotating device, the first unit may further comprise a leaf spring that is in contact with and cooperates with the key plane of the coupling shaft.

In the rotating device, the first unit may be provided with a cylindrical groove at a side opposite to the track, and the second unit may be provided with a truncated conical protrusion to be fitted into the cylindrical groove of the first unit.

According to a still further aspect of the present invention, there is provided a hinge device for use with the rotating device, comprising a rotating member, wherein the rotating member is rotated with an external force until a predetermined angle and without the external force after the predetermined angle, and the rotating member has a coupling shaft with a semicircular cross section.

BRIEF DESCRIPTION OF THE DRAWINGS

For better understanding of the objects and features of the present invention by those skilled in the art, preferred embodiments of the present invention will be described with reference to the accompanying drawings, in which:

FIG. 13 is an exploded perspective view of the hinge device shown in FIG. 12a;

FIGS. 15a to 15c are views showing sequential operations of the portable radiotelephone of FIG. 12a;

FIGS. 19a to 19c are views showing sequential operations of the portable radiotelephone of FIG. 17a;

DETAILED DESCRIPTION OF THE PREFERRED EMBODIMENT

Figure 1:
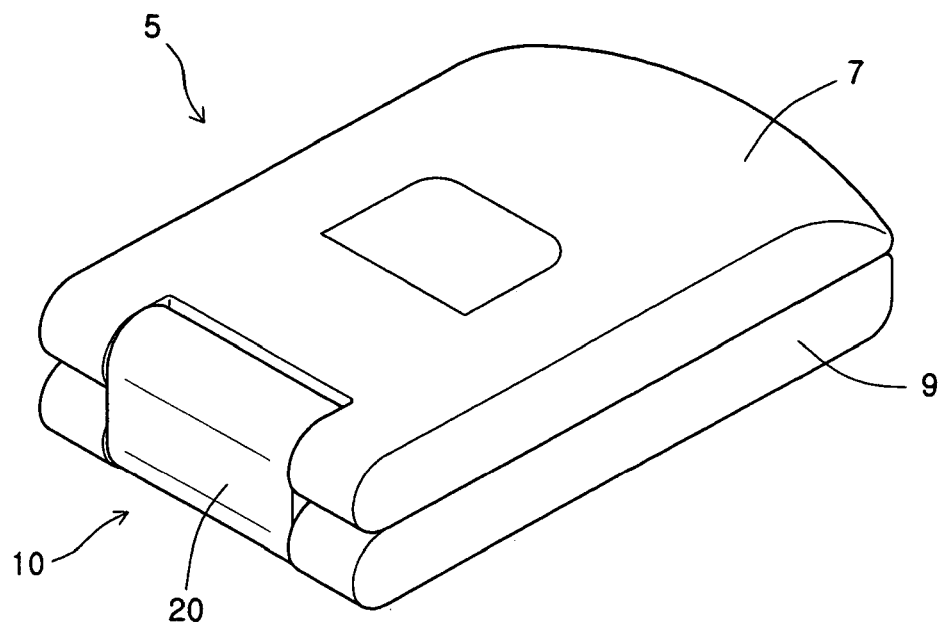
FIG. 1 is a perspective view of a portable radiotelephone according to a first embodiment of the present invention.

FIG. 1 is a perspective view of a folder-type portable radiotelephone according to a first embodiment of the present invention. Referring to FIG. 1, the portable radiotelephone 5 comprises a first case unit 7 provided with a liquid crystal display, and a second case unit 9 provided with a keypad. The first and second units 7 and 9 are rotatably coupled to each other by means of a hinge device 10 so that they can be moved to folded and unfolded positions of the radiotelephone.

Referring to FIGS. 1 to 4, the hinge device 10 comprises a case 20, first and second rotating members 30 and 40, first and second linearly moving members 60 and 70, first and second resilient members 98 and 99, first and second supporting plates 109 and 120, and a case cover 24.

Referring to FIGS. 1 to 4, the case 20 comprises first and second end walls 21 and 22, and a sidewall 23 for connecting the first and second end walls 21 and 23 to each other. The case cover 24 closes an opening that is not covered by the sidewall 23. First and second through-holes 211 and 212 are provided in the first end wall 21. Third and fourth through-holes 223 and 224 are provided at positions in the second end wall 22, which correspond to those of the first and second through-holes 211 and 212 formed in the first end wall 21. A line for connecting the centers of the facing first and third through-holes 211 and 223 becomes a first rotation axis 105, and a line for connecting the centers of the facing second and fourth through-holes 212 and 224 becomes a second rotation axis 110. The first unit 7 of the portable radiotelephone 5 rotates about the first rotation axis 105 with respect to the hinge device 10. The second unit 9 of the portable radiotelephone 5 slightly rotates about the second rotation axis 110 with respect to the hinge device 10.

The second end wall 22 is provided with a passage 225 for causing the two through-holes 223 and 224 to communicate with each other. A cable 300 (see FIG. 3) for electrically connecting the two units 7 and 9 of the portable radiotelephone 5 passes through the two through-holes 223 and 224 in the second end wall 22. The cable 300 is constructed in such a manner that both branches thereof extend from respective ones of the two units 7 and 9 of the portable radiotelephone 5 toward the other units and are bent toward the hinge 10 to extend into the hinge 10 and then bent back in the original direction to meet each other. An intermediate portion 301 that is bent toward and extends into the hinge 10 is inserted into the hinge through the two through-holes 223 and 224 and the passage 225 to be contained in a second chamber 27 of the case 20 to be described later. Although not specifically shown in the figures, the first and second units 7 and 9 comprise coupling projections that are rotatably inserted into the two through-holes 223 and 224 in the second end wall 22 of the hinge device 10, respectively. Although not specifically shown in the figures, it can be understood by those skilled in the art from the above description that the coupling projections are constructed such that the cable 300 passes through and is well contained within the coupling projections.

Figure 3:
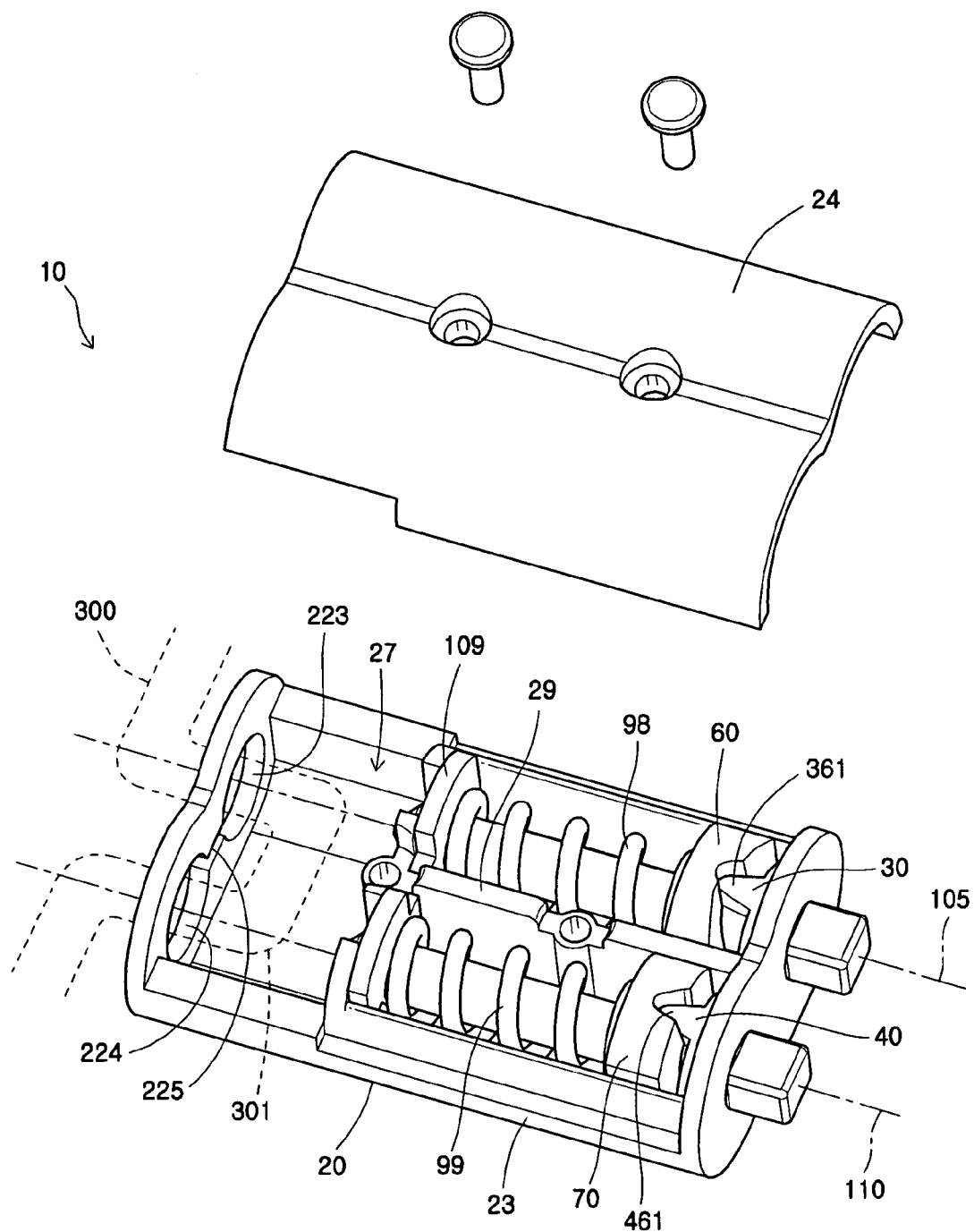
FIG. 3 is a perspective view showing the interior of the hinge device of the FIG. 2 with a case cover separated therefrom.
Figure 4:
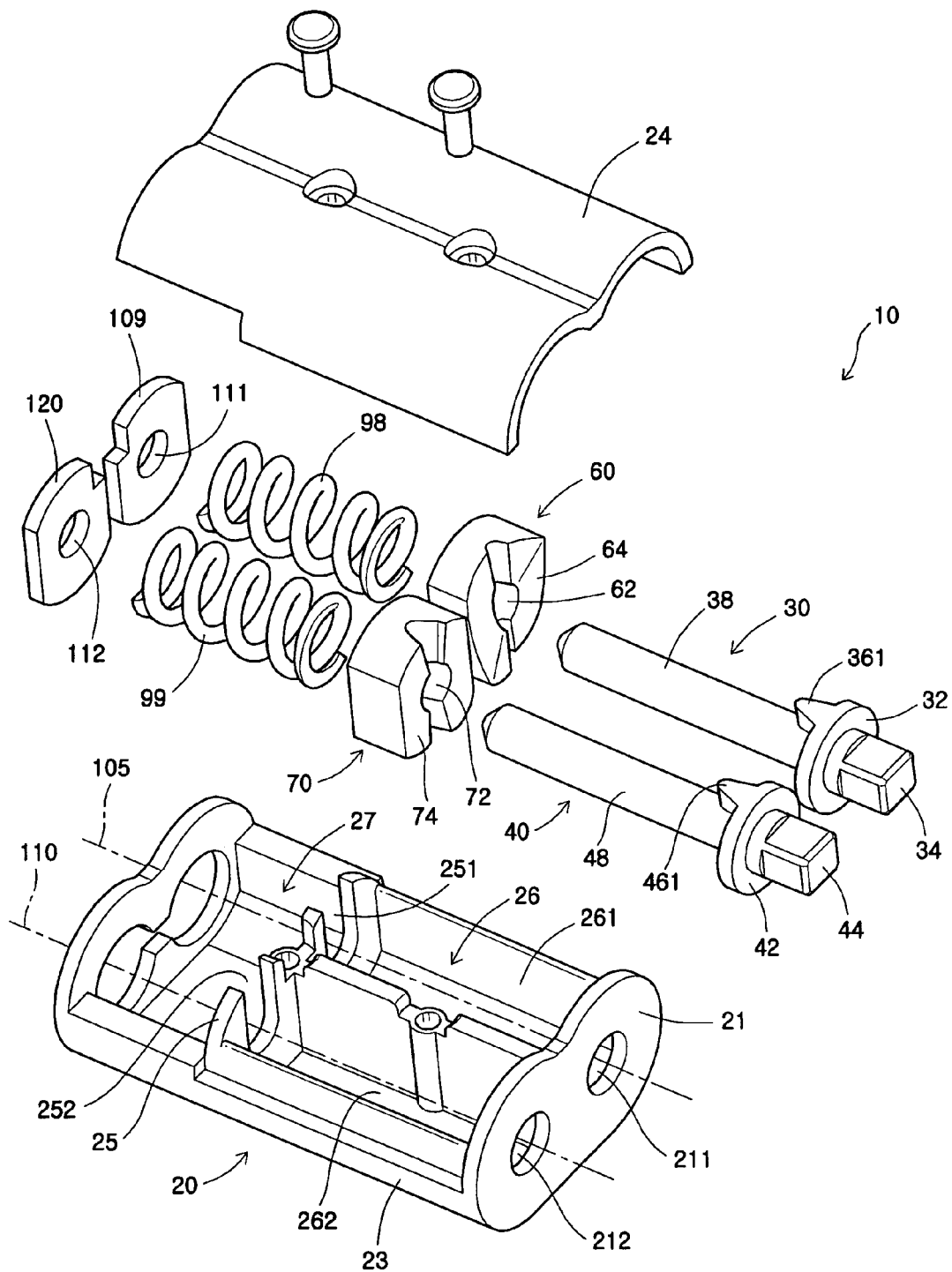
FIG. 4 is an exploded perspective view of the hinge device of FIG. 2.

Referring to FIGS. 3 and 4, a supporting wall 25 is provided in the case 20 to be parallel with the two end walls 21 and 22 at an intermediate position therebetween. The supporting wall 25 is provided with U-shaped passages 251 and 252 at positions at which the first and second rotation axes 105 and 110 intersect the supporting wall. The inner space of the case 20 is partitioned by the supporting wall 25 into a first chamber 26 on the side of the first end wall 21 and the second chamber 27 on the side of the second end wall 22. The first chamber 26 is divided again into two halves, i.e. a first sub-chamber 261 through which the first rotation axis 105 passes and a second sub-chamber 262 through which the second rotation axis 110 passes, by means of an upright separation wall 29 connecting the supporting wall 25 and the first end wall 21. The first sub-chamber 261 contains the first rotating member 30, the first linearly moving member 60, the first resilient member 98 and the first supporting plate 109, which will be described later. The second sub-chamber 262 contains the second rotating member 40, the second linearly moving member 70, the second resilient member 99 and the second supporting plate 120, which will be described later. The first and second rotating members 30 and 40 rotate about the first and second rotation axes 105 and 110, respectively.

Figure 5:
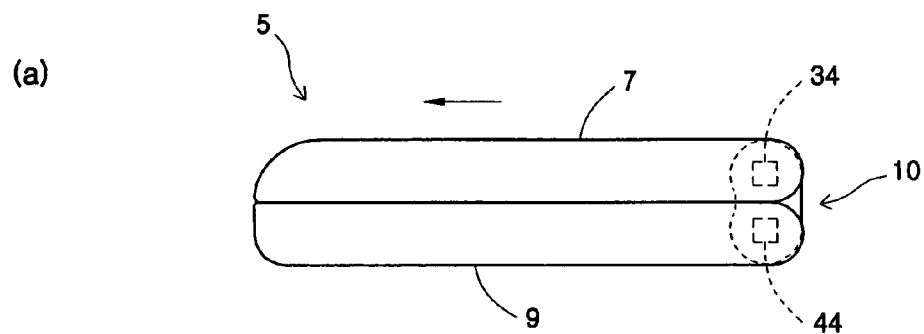
FIG. 5 (a) is a side view showing a state where the portable radiotelephone of FIG. 1 is completely folded, and FIGS. 5 (b) and (c) are views showing first and second cam portions of the hinge device in deployed states together with positions of corresponding cam follower protrusions when the portable radiotelephone is in the state shown in FIG. 5 (a)
Figure 5:
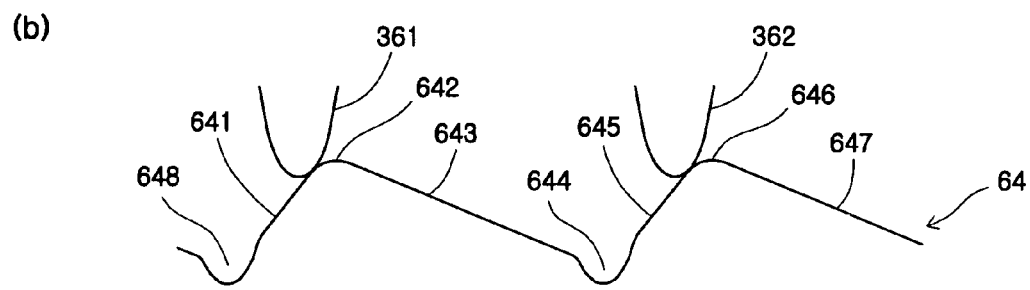
Figure 5:
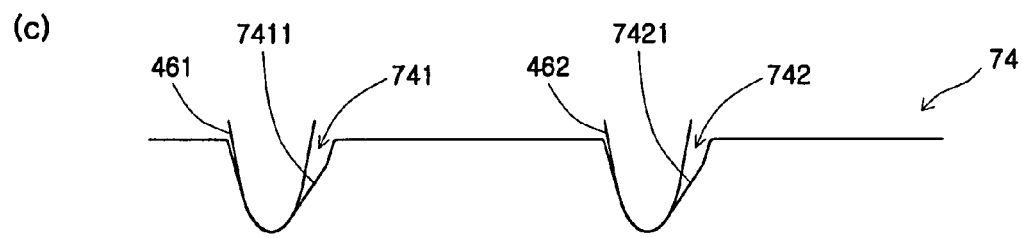

The first and second rotating members 30 and 40 take the shape of elongated posts extending between the first end wall 21 and the supporting wall 25 within the first and second sub-chambers 261 and 262 of the case 20, respectively. The first and second rotating members 30 and 40 comprise base portions 32 and 42, coupling portions 34 and 44, cam follower portions, and extension rods 38 and 48, respectively. Since the first and second rotating members 30 and 40 have the same configuration as each other, only the first rotating member 30 will be described in detail below. The base portion 32 is in the form of a disk of which one end surface is in contact with the first end wall 21 of the first sub-chamber 261 of the case 20. The coupling portion 34 is in the form of a rectangular rod and extends from the base portion 32 so that it can protrude outside of the case 20 through a through-hole 211 in the first end wall 21. Although not specifically shown in the figures, the coupling portions 34 and 44 of the first and second rotating members 30 and 40 are engaged with coupling holes provided in the first unit (designated by reference numeral 7 in FIG. 1) and the second unit (designated by reference numeral 9 in FIG. 1) of the portable radiotelephone (designated by reference numeral 5 in FIG. 1), respectively. The extension rod 38 extends from the base portion 32 to the supporting wall 25 of the case 20 so that a distal end of the extension rod can be fitted into a passage 251. Referring to FIGS. 3, 4 and 5 (b), the cam follower portion is provided with two cam follower protrusions 361 and 362 placed at an interval of 180 degrees (only one cam follower 361 shown in FIGS. 3 and 4). The two cam follower protrusions 361 and 362 protrude from the base portion 32 at both sides of the extension rod 38 in the same direction as the extension rod 38.

Through-holes 62 and 72 are formed at the centers of the first and second linearly moving members 60 and 70, respectively. The extension rods 38 and 48 of the first and second rotating members 30 and 40 are fitted into the through-holes 62 and 72. The first and second linearly moving members 60 and 70 have cam portions 64 and 74 formed at surfaces thereof facing the cam follower protrusions 361 and 362 of the first rotating member 30 and the cam follower protrusions 461 and 462 of the second rotating members 40, respectively. The cam follower protrusions 361 and 362 of the first rotating member 30 cooperates with the first cam portions 64 of the first linearly moving member 60, while the cam follower protrusions 461 and 462 of the second rotating member 40 cooperates with the second cam portion 74 of the second linearly moving member 70. Deployed cam profiles of the first and second cam portions 64 and 74 of the first and second linearly moving members 60 and 70 are specifically shown in FIGS. 5 (a) and (b), respectively (also shown in FIGS. 6 and 7).

Referring to FIGS. 4 and 5 (b), the first cam portion 64 is symmetric with respect to the first rotation axis 105 and has identical profiles at an interval of 180 degrees. The first cam portion 64 of the first linearly moving member 60 comprises, sequentially along the circumference thereof, a first slanted surface 641, a first peak 642, a second slanted surface 643, a first valley provided with fixing groove 644, a third slanted surface 645, a second peak 646, a fourth slanted surface 647, and a second valley provided with fixing groove 648. The slopes of the second and fourth slanted surfaces 643 and 647 are gentler than those of the first and third slanted surfaces 641 and 645. The two cam follower protrusions 361 and 362 of the first rotating member 30 are fitted into the respective fixing grooves 644 and 648. The fixing grooves 644 and 648 are configured such that the cam follower protrusions 361 and 362 fitted into the fixing grooves 644 and 648 can be moved only toward the relatively gently slanted surfaces 643 and 647. To this end, portions of the fixing grooves 644 and 648 contiguous to the relatively steeply slanted surfaces 641 and 645 are formed steeply and deeply, while portions of the fixing grooves 644 and 648 contiguous to the relatively gently slanted surfaces 643 and 647 are formed gently. The degree of steepness thereof can be properly determined according to the shape of the cam follower protrusions 361 and 362.

Referring to FIGS. 4 and 5 (c), the second cam portion 74 of the second linearly moving member 70 is symmetric with respect to the second rotation axis 110 and has identical profiles at an interval of 180 degrees. The second cam portion 74 of the second linearly moving member 70 comprises a first receiving groove 741 and a second receiving groove 742. The two cam follower protrusions 461 and 462 of the second rotating member 40 are received in the first and second receiving grooves 741 and 742, respectively. The first and second receiving grooves 741 and 742 take the same shape. At one side of each of the first and second receiving grooves, a slanted surface 7411 or 7421 is formed to extend from a valley 7412 or 7422 such that the cam follower protrusions 461 and 462 received therein can be slightly moved, and subsequently to be slanted steeply, i.e. more steeply than the second and fourth slanted surfaces 643 and 647 of the first cam portion 64, thereby limiting the movement of the cam follower protrusions 461 and 462. Therefore, the second rotating member 40 can be slightly rotated only in one direction. The slanted surfaces 7411 and 7421 are formed to be steeper than the second and fourth slanted surfaces 643 and 647 of the first cam portion 64. This is to stop the cam follower protrusions 461 and 462 of the second rotating member 40 and to allow the movement of only the cam follower protrusions 361 and 362 of the first rotating member 30 upon folding of the portable radiotelephone.

Referring to FIGS. 3 and 4, the first and second resilient members 98 and 99, which are preferably compression coil springs, are fitted around the first and second extension rods 38 and 48 of the first and second rotating members 30 and 40, respectively. One side of each of the first and second resilient members 98 and 99 is in contact with the first or second linearly moving member 60 or 70 and the other side is in contact with the first or second supporting plate 109 or 120 to urge the first or second linearly moving member 60 or 70 against the cam follower protrusions 361 and 362 of the first rotating member 30 or the cam follower protrusions 461 and 462 of the second rotating member 40.

The first and second supporting plates 109 and 120 take the same shape and are contained in the first and second sub-chambers 261 and 262 of the case 20 to be in contact with the supporting wall 25, respectively. The first and second supporting plates 110 and 120 are in contact with one ends of the first and second resilient members 98 and 99, respectively. The two supporting plates 109 and 120 are provided with passages 111 and 112, respectively, so that the first and second extension rods 38 and 48 of the first and second rotating members 30 and 40 can pass therethrough.

Figure 6:
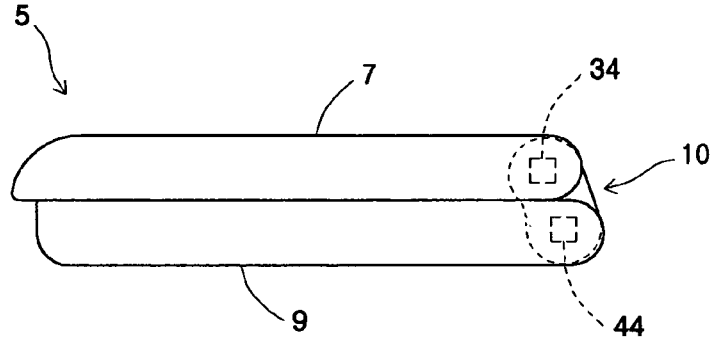
FIG. 6 (a) is a side view showing a state where a second unit of the portable radiotelephone is pulled to unfold the portable radiotelephone from the completely folded state of FIG. 5 (a), and FIGS. 6 (b) and (c) are views showing the first and second cam portions of the hinge device in the deployed states together with the positions of the corresponding cam follower protrusions when the portable radiotelephone is in the state shown in FIG. 6 (a)
Figure 6:
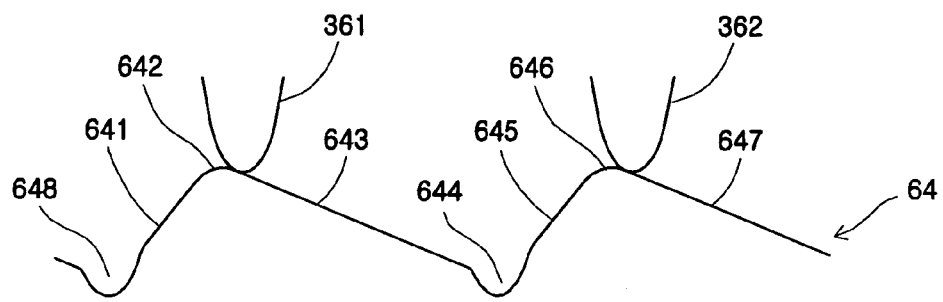
Figure 6:
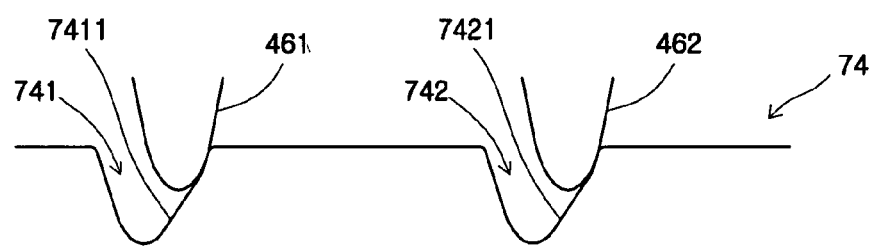

Now, the operation of this embodiment will be described in detail with reference to FIGS. 5 to 7. FIG. 5 (a) is a side view showing a state where the portable radiotelephone of FIG. 1 is completely folded, and FIGS. 5 (b) and (c) are views showing the positions of the first and second cam follower protrusions on the cam surfaces of the first and second cam portions in the hinge device when the portable radiotelephone is in the state shown in FIG. 5 (a). Referring to FIG. 5 (a), the coupling portion 34 of the first rotating member 30 of the hinge device 10 is coupled to the first unit 7 of the portable radiotelephone 5, and the coupling portion 44 of the second rotating member 40 of the hinge device 10 is coupled to the second unit 9 of the portable radiotelephone 5. Referring to FIG. 5 (*b*), the two cam follower protrusions 361 and 362 of the first rotating member (designated by reference numeral 30 in FIGS. 3 and 4) are located on the first and third slanted surfaces 641 and 645 of the first cam portion 64, respectively. Referring to FIG. 5 (*c*), the two cam follower protrusions 461 and 462 of the second rotating member (designated by reference numeral 40 in FIGS. 3 and 4) are located on the bottoms of the first and second receiving grooves 741 and 742, respectively. As shown in FIG. 3, the first and second resilient members 98 and 99 urge the first and second linearly moving members 60 and 70 against the cam follower protrusions 361 and 362 of the first rotating member 30 and the cam follower protrusions 461 and 462 of the second rotating member 40, respectively. Therefore, forces are exerted on the cam follower protrusions 361 and 362 of the first rotating member 30 so that the cam follower protrusions can be moved in a direction descending along the first and third slanted surfaces 641 and 645 of the first cam portion 64. This direction corresponds to a direction in which the portable radiotelephone 5 is folded. Further, the cam follower protrusions 461 and 462 of the second rotating member 40 are located and cannot be moved in the first and second receiving grooves 741 and 742 of the second cam portion 74. Since the portable radiotelephone 5 has already been in the completely folded state as shown in FIG. 5 (*a*), a force generated by the hinge device 10, which intends to fold the portable radiotelephone 5, functions to stably maintain the portable radiotelephone 5 in the folded state.

To unfold the portable radiotelephone 5 from the state of FIG. 5, the first unit 7 is pulled and slid in a direction designated by an arrow away from the portion where the hinge device 10 is mounted. This state of the portable radiotelephone is shown in FIG. 6 (*a*). FIGS. 6 (*b*) and (*c*) are views showing the positions of the first and second cam follower protrusions on the first and second cam portions of the hinge device when the portable radiotelephone is in the state shown in FIG. 6 (*a*), respectively. Referring to FIGS. 6 (*a*) to (*c*), the hinge device 10 is placed in a state where it is slightly rotated and inclined with respect to the first and second units 7 and 9 of the portable radiotelephone 5. Due to the rotation, the two cam follower protrusions 361 and 362 of the first rotating member 30 pass over the first and second peaks 642 and 646 of the first cam portion 64 and then enter the second and fourth slanted surfaces 643 and 647, respectively. The two cam follower protrusions 461 and 462 of the second rotating member 40 are slightly moved along the slanted surfaces 7411 and 7421 of the first and second receiving grooves 741 and 742 of the second cam portion 74. If there is no external force in this state, the two cam follower protrusions 361 and 362 of the first rotating member 30 can be automatically moved in a direction descending along the second and fourth slanted surfaces 643 and 647 of the first cam portion 64. With this movement, the first unit 7 of the portable radiotelephone 5 is rotated in the direction in which the portable radiotelephone 5 is unfolded. Consequently, the two cam follower protrusions 361 and 362 are moved along the slanted surfaces 643 and 647 and then fitted into and stopped in the first and second fixing grooves 644 and 648 of the first cam portion 64. At this time, the portable radiotelephone 5 is in a completely unfolded state. With the urging force of the second resilient member 99, the two cam follower protrusions 461 and 462 of the second rotating member 40 are returned to the bottoms of the first and second receiving grooves 741 and 742. FIG. 7 (*a*) is a side view showing a state where the portable radiotelephone of FIG. 1 is completely unfolded, and FIGS. 7 (*b*) and (*c*) are views showing the positions of the first and second cam follower protrusions on the first and second cam portions of the hinge device when the portable radiotelephone is in the state shown in FIG. 7 (*a*).

Figure 7:
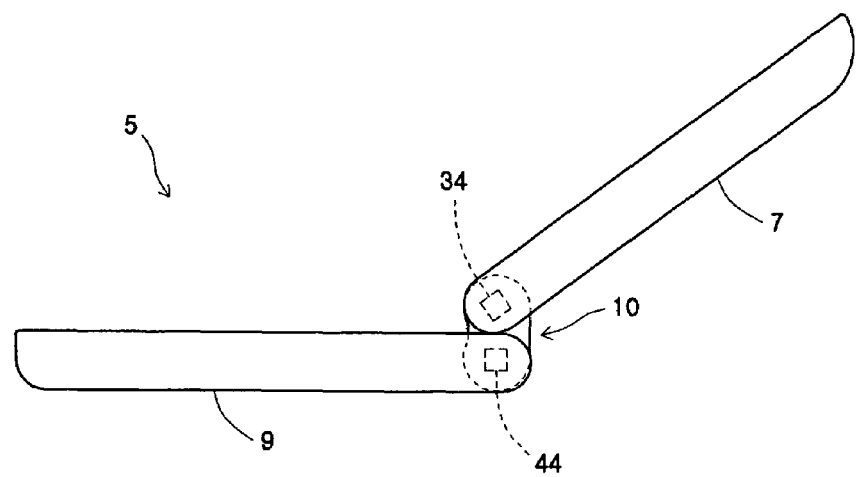
FIG. 7 (a) is a side view showing a state where the portable radiotelephone of FIG. 1 is completely unfolded, and FIGS. 7 (b) and (c) are views showing the first and second cam portions of the hinge device in the deployed states together with the positions of the corresponding cam follower protrusions when the portable radiotelephone is in the state shown in FIG. 7 (a)
Figure 7:
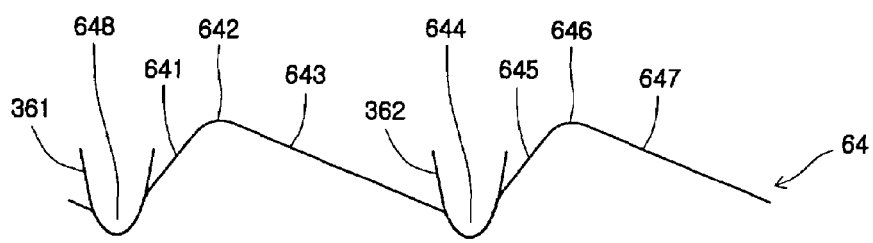
Figure 7:
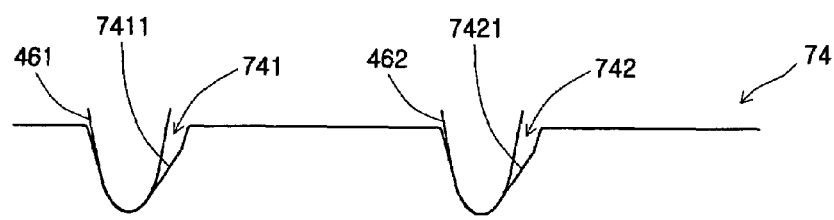

When the first unit 7 is rotated to fold the portable radiotelephone from the completely unfolded state shown in FIG. 7, the two cam follower protrusions 361 and 362 of the first rotating member 30 of the hinge device 10 come out from the fixing grooves 644 and 648 of the first cam portion 64 and are moved while ascending along the second and fourth slanted surfaces 643 and 647. At this time, the two cam follower protrusions 461 and 462 of the second rotating member 40 are not moved. This is because the slanted surfaces 7411 and 7421 formed at the first and second receiving grooves 741 and 742 of the second cam portion 74 are steeper than the second and fourth slanted surfaces 643 and 647 of the first cam portion 64. When the first unit 7 of the portable radiotelephone 5 is further rotated in the direction in which the portable radiotelephone is folded, the two cam follower protrusions 361 and 362 of the first rotating member 30 pass over the first and second peaks 642 and 646 of the first cam portion 64 and then enter the first and second slanted surfaces 641 and 645, respectively. Thereafter, the portable radiotelephone 5 is automatically folded.

Figure 2:
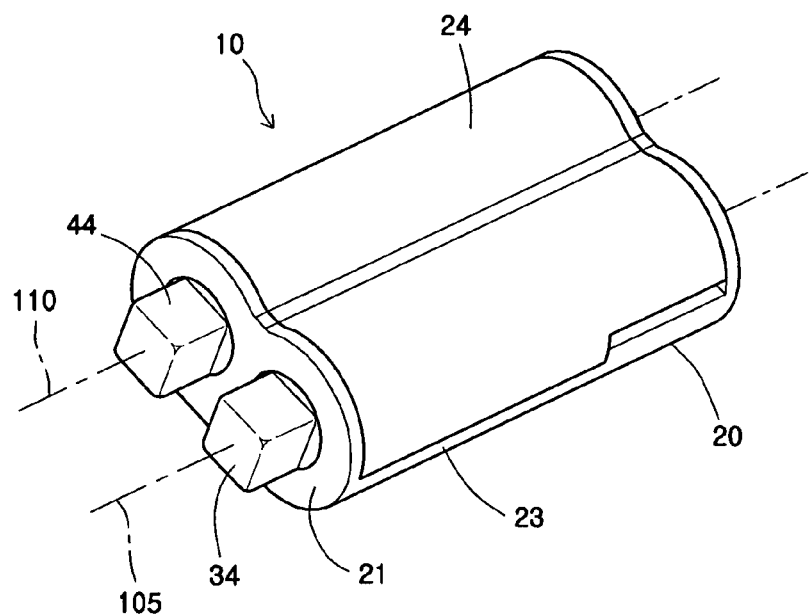
FIGS. 2 (a) and (b) are perspective views of a hinge device used for the portable radiotelephone of FIG. 1.
Figure 2:
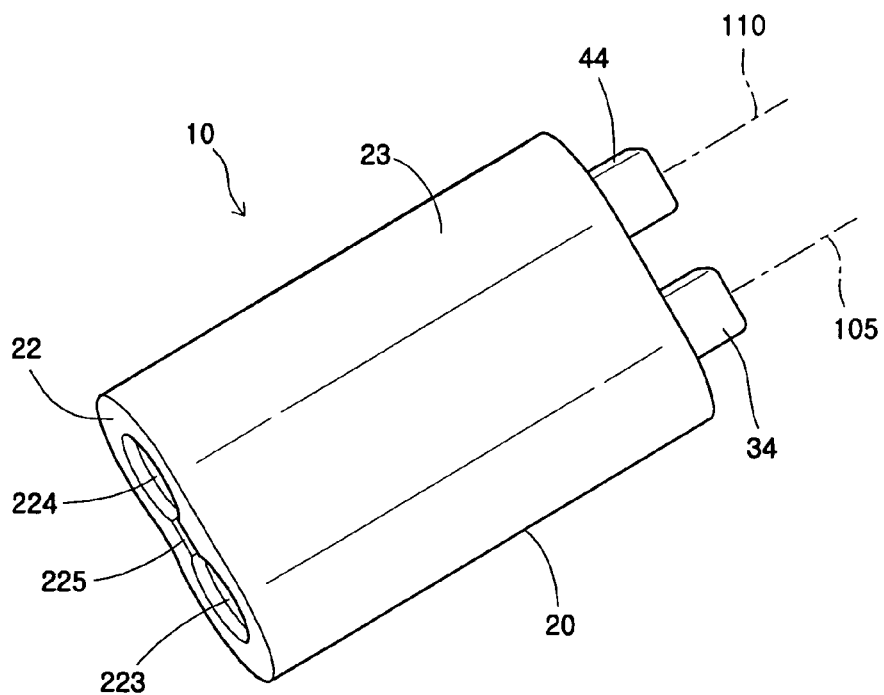
Figure 8:
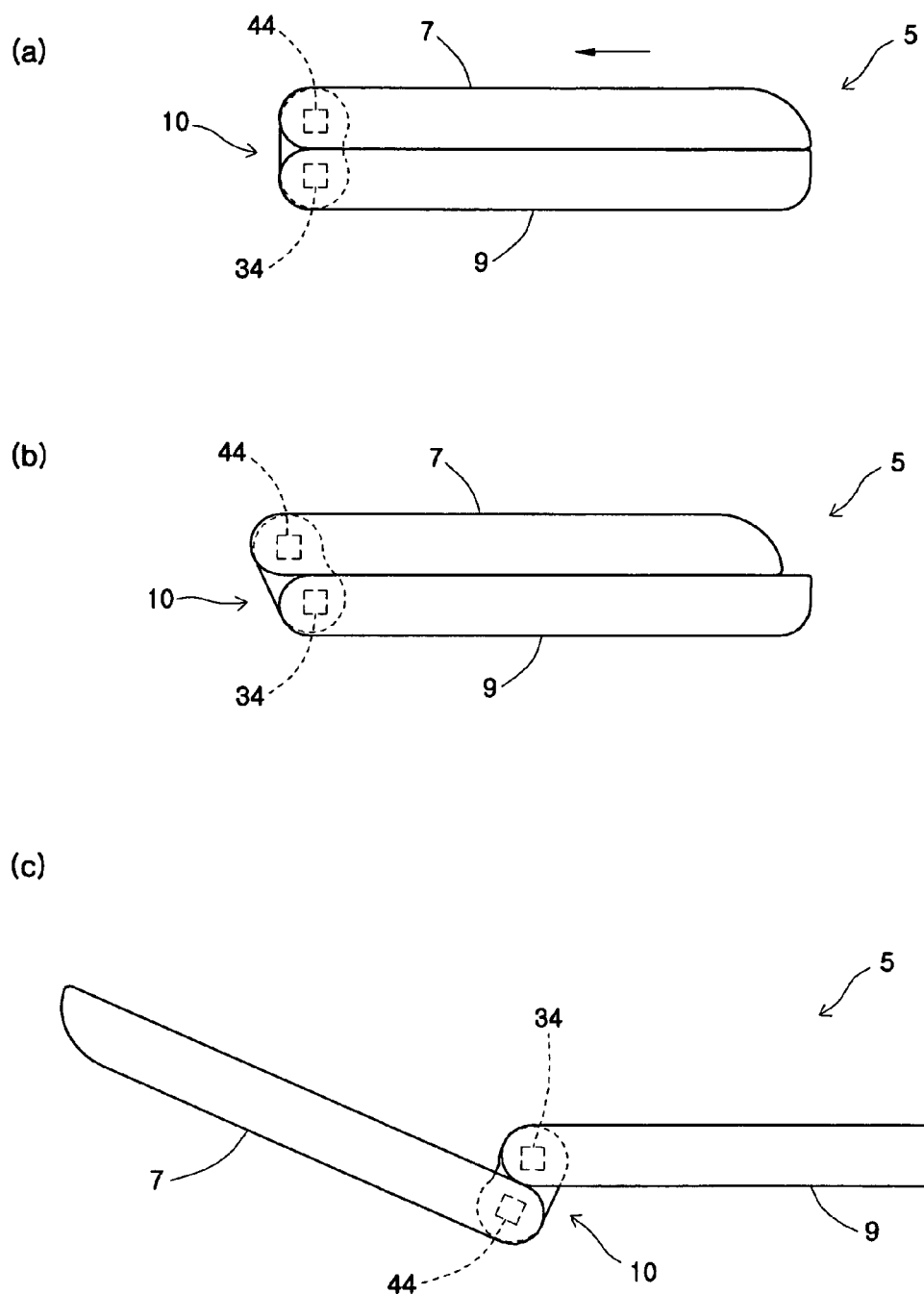
FIGS. 8 (a) to (c) are side views showing sequential steps of the process of unfolding a modified portable radiotelephone with the hinge device of FIG. 2 installed therein.

FIGS. 8 (*a*) to (*c*) are side views showing sequential steps of the process of unfolding a modified portable radiotelephone with the hinge device of FIG. 2 installed therein. Referring to FIGS. 8 (*a*) to (*c*), the coupling portion 34 of the first rotating member (designated by reference numeral 30 in FIGS. 3 and 4) of the hinge device 10 is coupled to the second unit 9 of the portable radiotelephone 5, and the coupling portion 44 of the second rotating member (designated by reference numeral 40 in FIGS. 3 and 4) of the hinge device is coupled to the first unit 7 of the portable radiotelephone 5 (the embodiment shown in FIG. 8 may be considered as a version in which the positions of the first and second units of the embodiment shown in FIG. 5 are interchanged). Referring to FIG. 8 (*a*), the portable radiotelephone 5 is in the completely folded state. This state of the hinge device 10 is identical with those shown in FIGS. 5 (*b*) and (*c*). To unfold the portable radiotelephone 5 from the completely folded state, the first unit 7 is pushed and slid in a direction designated by an arrow toward the portion where the hinge device 10 is mounted. Then, the portable radiotelephone 5 is in a state shown in FIG. 8 (*b*). At this time, the state of the hinge device 10 is identical with those shown in FIGS. 6 (*b*) and (*c*). In this state, the portable radiotelephone 5 is automatically unfolded to be in the state shown in FIG. 8 (*c*). At this time, the state of the hinge device 10 is identical with those shown in FIGS. 7 (*b*) and (*c*).

Figure 9:
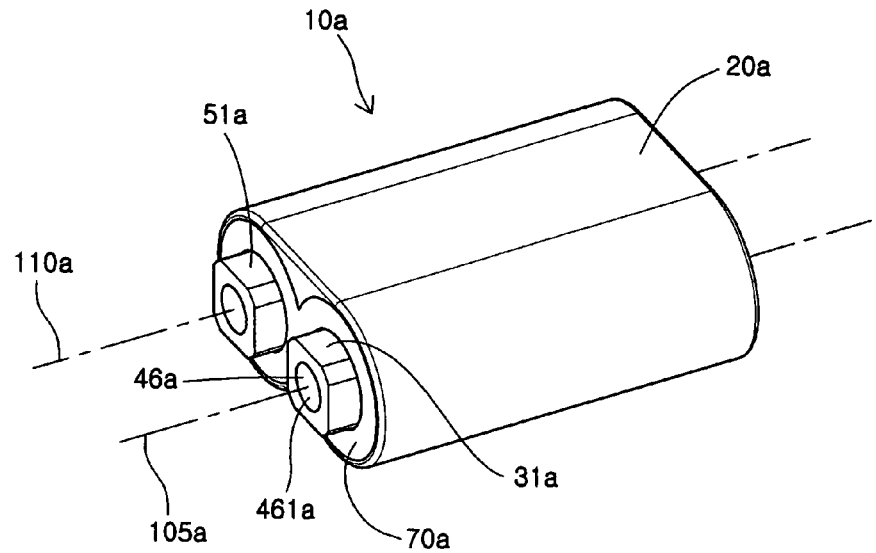
FIG. 9 is a perspective view showing a hinge device used for the portable radiotelephone of FIG. 1 according to another embodiment of the present invention.
Figure 10:
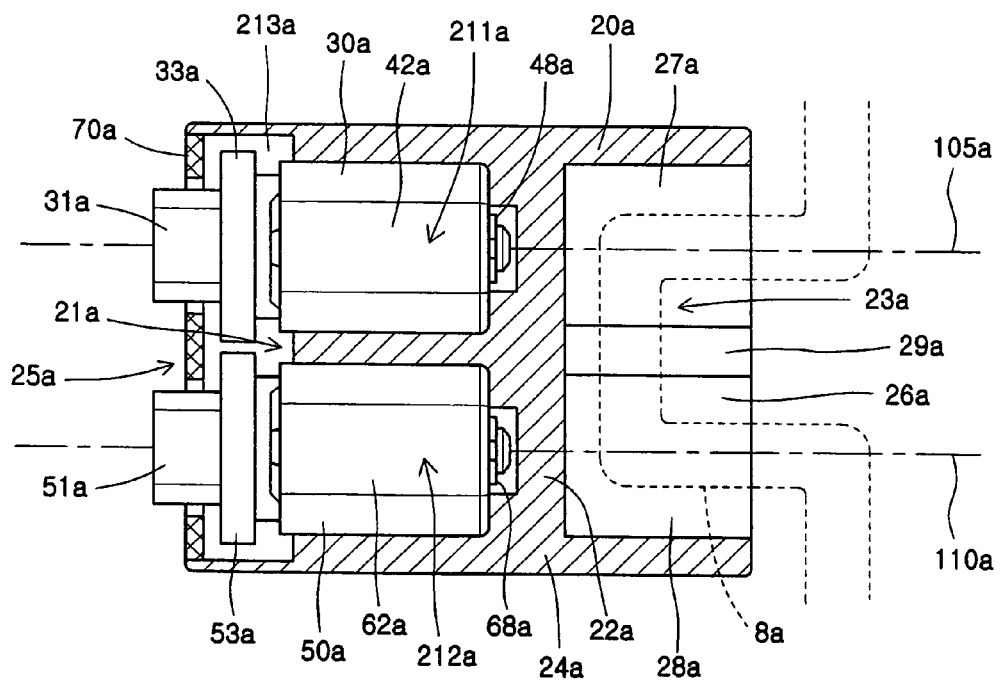
FIG. 10 is a view showing the interior of the hinge device of FIG. 9, with a case thereof cut away.
Figure 11:
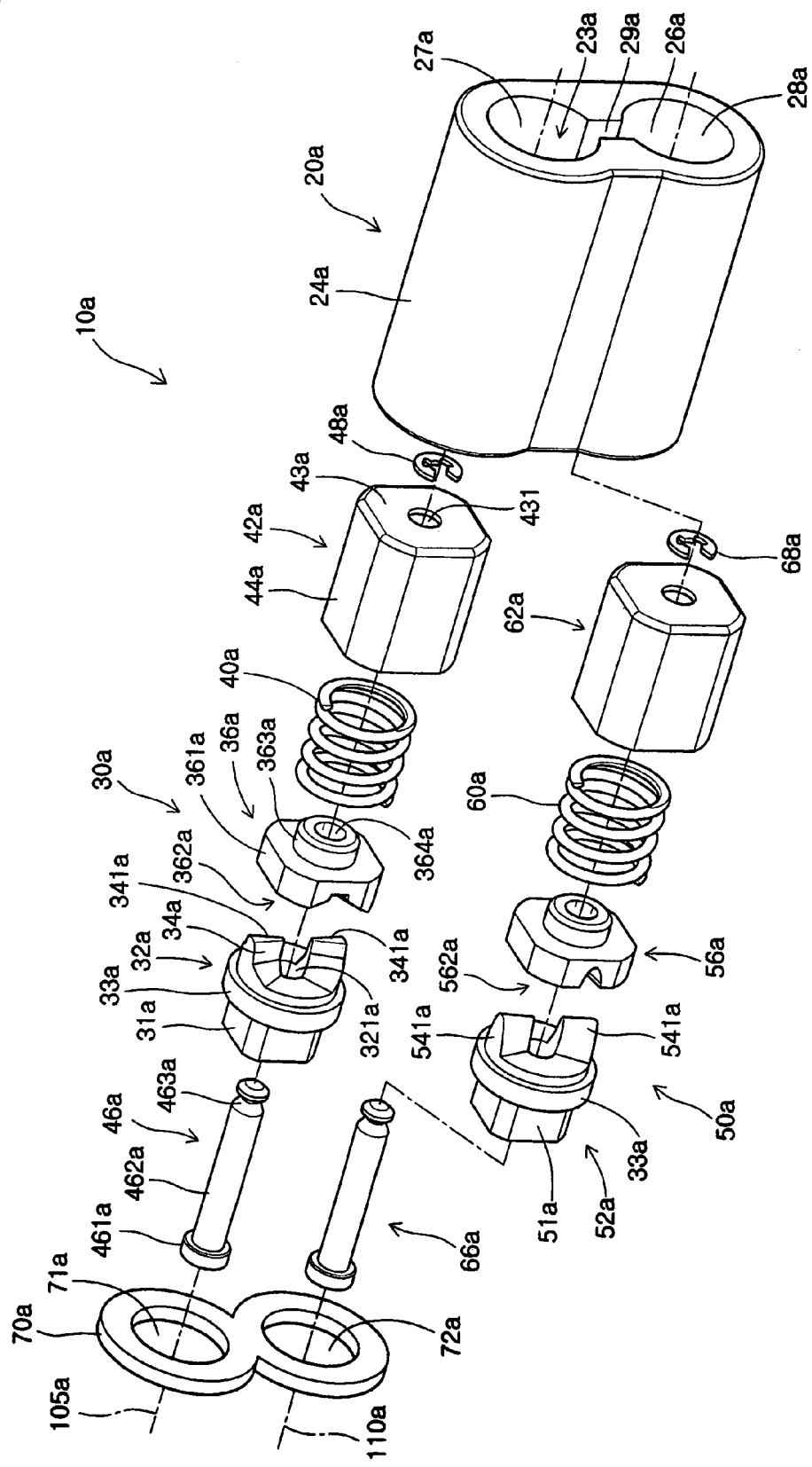
FIG. 11 is an exploded perspective view of the hinge device of FIG. 9.

FIGS. 9 to 11 are views showing a hinge device used for the portable radiotelephone of FIG. 1 according to another embodiment of the present invention. Referring to FIGS. 9 to 11, the hinge device 10*a* comprises a case 20*a*, a first hinge module 30*a*, a second hinge module 50*a*, and a cover 70*a*. The case 20*a* comprises an inner wall 22*a*, and sidewalls 24*a* extending in opposite directions along first and second rotation axes 105*a* and 110*a* from the inner wall 22*a*. First and second spaces 21*a* and 23*a* with the inner wall 22*a* interposed therebetween are defined within the case 20*a*. Both ends of the case 20*a* are open to define first and second open ends 25*a* and 26*a*. The first open end 25*a* becomes an entrance of the first space 21*a*, and the second open end 26*a* becomes an entrance of the second space 23*a*. First and second mounting holes 211*a* and 212*a* into which respective housings 42*a* and 62*a* of the first and second hinge modules 30*a* and 50*a*, which will be described later, are fitted are provided in parallel at a position in the first space 21*a* inwardly spaced slightly apart from the first open end 25*a*. The sizes and shapes of the first and second mounting holes 211a and 212a are determined such that the respective housings 42a and 62a of the first and second hinge modules 30a and 50a are tightly fitted thereinto not to rotate with respect to the case 20a. A base portion 33a of a first rotating member 32a of the first hinge module 30a and a base portion 53a of a second rotating member 52a of the second hinge module 50, which will be described later, are placed in a space 213a between the first open end 25a and entrances of the first and second mounting holes 211a and 212a. The first open end 25a is blocked by the cover 70a. The second space 23a is provided with first and second connection holes 27a and 28a formed in parallel along the first and second rotation axes 105 and 110a from the second open end 26a toward the inner wall 22a. A connection passage 29a is provided between the first and second connection holes 27a and 28a to connect them to each other. A cable 8a for electrically connecting the two units (designated by reference numerals 7 and 9 in FIG. 5) of the portable radiotelephone 5 (designated by reference numeral 5 in FIG. 5) passes through the two connection holes 27a and 28a and the connection passage 29a, as shown in the figure.

Referring to FIGS. 9 to 11, the first hinge module 30a comprises the first rotating member 32a, a first linearly moving member 36a, a first resilient member 40a, the first housing 42a, a first coupling rod 46a, and a first stopper ring 48a. The first housing 42a comprises an end wall 43a, and sidewalls 44a extending along the first rotation axis 105a from the end wall 43a. A side of the first housing opposite to the end wall 43a is open to form an entrance of the first housing 43a. The center of the end wall 43a is provided with a through-hole 431a. A distal end of the first coupling rod 46a to be described later protrudes through the through-hole 431a and is then engaged with the first stopper ring 48a such as an E-ring. The sidewalls 44a are composed of a plurality of flat walls connected to one another. These flat walls function as keys when inserted and assembled into the first mounting hole 211a of the case 20a, thereby ensuring rotation together with the first housing 42a. Further, as described later, the flat walls also function to cause the first linearly moving member 36a contained in the first housing to be rotated together with the first housing.

Referring to FIGS. 9 to 11, the first rotating member 32a comprises the base portion 33a, a first coupling portion 31a, and a first cam follower portion 34a. The base portion 33a takes the shape of a cylinder with low height (i.e. flat disk) and has the first coupling portion 31a and the first cam follower portion 34a at both sides thereof. The first coupling portion 31a takes the shape of a square post with low height which protrudes from the base portion 31a and of which edges are chamfered. The first coupling portion 31a protrudes beyond the cover 70a for blocking the first open end 25a of the first housing 42a. The first cam follower portion 34a comprises two cam follower protrusions 341a protruding from the base portion 33a. The two cam follower protrusions 341a take the same shape and are symmetric with respect to the first rotation axis 105a. Each of the two cam follower protrusions 341a is tapered with thickness gradually decreasing toward a rounded distal end thereof. The first rotating member 32a is provided with a passage hole 321a penetrating through the center thereof along the first rotation axis 105a. The first coupling rod 46a passes through the passage hole 321a. Although not specifically shown in the figures, an entrance of the passage hole 321a on the side of the first coupling portion 31a is countersunk to receive a head 461a of the first coupling rod 46a to be described later.

Referring to FIG. 11, the first linearly moving member 36a comprises sidewalls 361a, a first cam portion 362a formed on a surface thereof facing the first rotating member 32a, and a cylindrical boss 363 extending from the center of a reverse surface thereof opposite to the first cam portion 362a. The first linearly moving member 36a is provided with a through-hole 364a along the first rotation axis 105a. The first coupling rod 46a passes through the through-hole 364a. The sidewalls 361a are identical with the sidewalls 44a of the first housing 42a in shape. The first linearly moving member 36a constructed as above is fitted into the first housing 42a such that it cannot rotate but can move linearly along the first rotation axis 105a. The first cam portion 362a is formed circumferentially around the first rotation axis 105a. Since the configuration of the first cam portion 362a is the same as the first cam portion 64 of the embodiment shown in FIG. 4 (the detailed configuration is shown in FIG. 5 (b)), a detailed description thereof will be omitted. The first cam portion 362a cooperates with the two cam follower protrusions 341a of the first rotating member 32a.

Referring to FIG. 11, the first resilient member 40a urges the first linearly moving member 36a against the first rotating member 32a. The first resilient member 40a is preferably a compression coil spring. The boss 363a of the first linearly moving member 36a is inserted into one side of the first resilient member 40a.

Referring to FIGS. 9 and 11, the first coupling portion 46a comprises the head 461a, and an elongated cylindrical body 462a extending along the first rotation axis 105a from the head 461a. A distal end of the body 462a is provided with an annular coupling groove 463a. The head 461a is accommodated in the entrance of the passage hole 321a of the first rotating member 32a on the side of the first coupling portion 31a. The body 462a sequentially passes through the passage hole 321a of the first rotating member 32a, the through-hole 364a of the first linearly moving member 36a, and the interior of the first resilient member 40a so that the distal end of the body 462a protrudes outside through the through-hole 431a provided in the end wall 43a of the first housing 42a. At this time, the coupling groove 463a provided at the distal end of the body 462a is also exposed outside of the end wall 43a of the first housing 42a. The first stopper ring 48a called an "E-ring" is engaged with the coupling groove 463a to couple the first coupling rod 46a to the first housing 42a. The first rotating member 32a can rotate about the body 462a of the first coupling rod 46a.

Referring to FIG. 11, the second hinge module 50a comprises the second rotating member 52a, a second linearly moving member 56a, a second resilient member 60a, the second housing 62a, a second coupling rod 66a, and a second stopper ring 68a. The second linearly moving member 56a has a second cam portion 562a. The second cam portion 562a is formed circumferentially around the second rotation axis 110a. Since the configuration of the second cam portion 562a is the same as the second cam portion 74 of the embodiment shown in FIG. 4 (the detailed configuration is shown in FIG. 5 (c)), a detailed description thereof will be omitted. The second cam portion 562a cooperates with the two cam follower protrusions 541a of the second rotating member 52a. Since other structures of the second hinge module 50a except the second cam portion 562a are the same as the first hinge module 30a, detailed description thereof will be omitted.

Referring to FIGS. 9 to 11, the cover 70a is coupled to the case 20a to block the first open end 25a of the case 20a. The cover 70a has first and second through-holes 71a and 72a through which the first and second coupling portions 31a and 51a of the first and second hinge modules 30a and 50a penetrate, respectively.

Since the operation of the hinge device shown in FIGS. 9 to 11 is the same as the hinge device shown in FIGS. 2 to 8, a detailed description thereof will be omitted. In case of the hinge device shown in FIGS. 9 to 11, the hinge device is assembled by coupling the first and second hinge modules 30a and 50a in advance and inserting them into the first and second mounting holes 211a and 212a of the case 20a that can be standardized, respectively. Therefore, the assembly of the hinge device is facilitated.

Figure 12A:
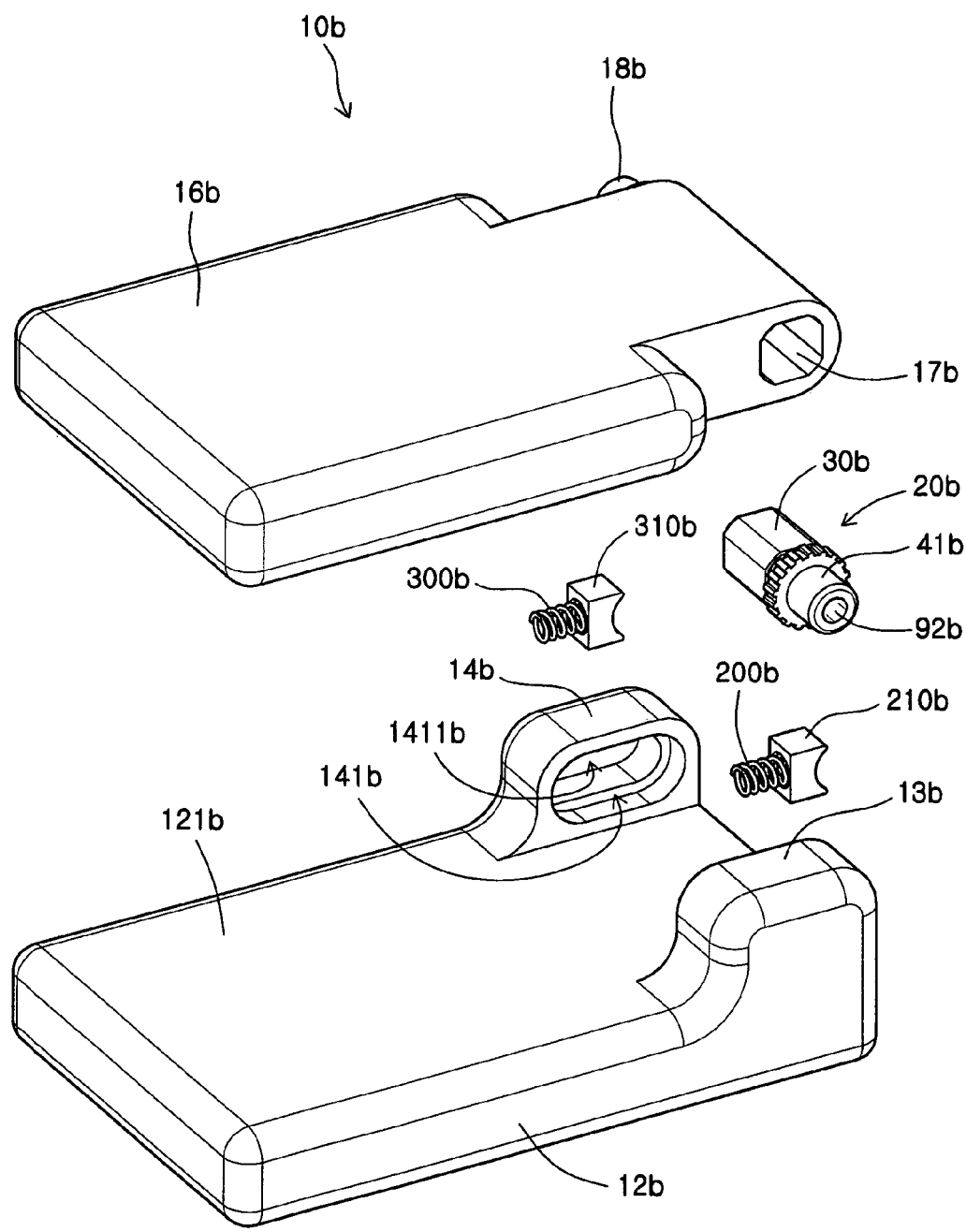
FIGS. 12a and 12b are exploded perspective views of a portable radiotelephone according to a second embodiment of the present invention.
Figure 12B:
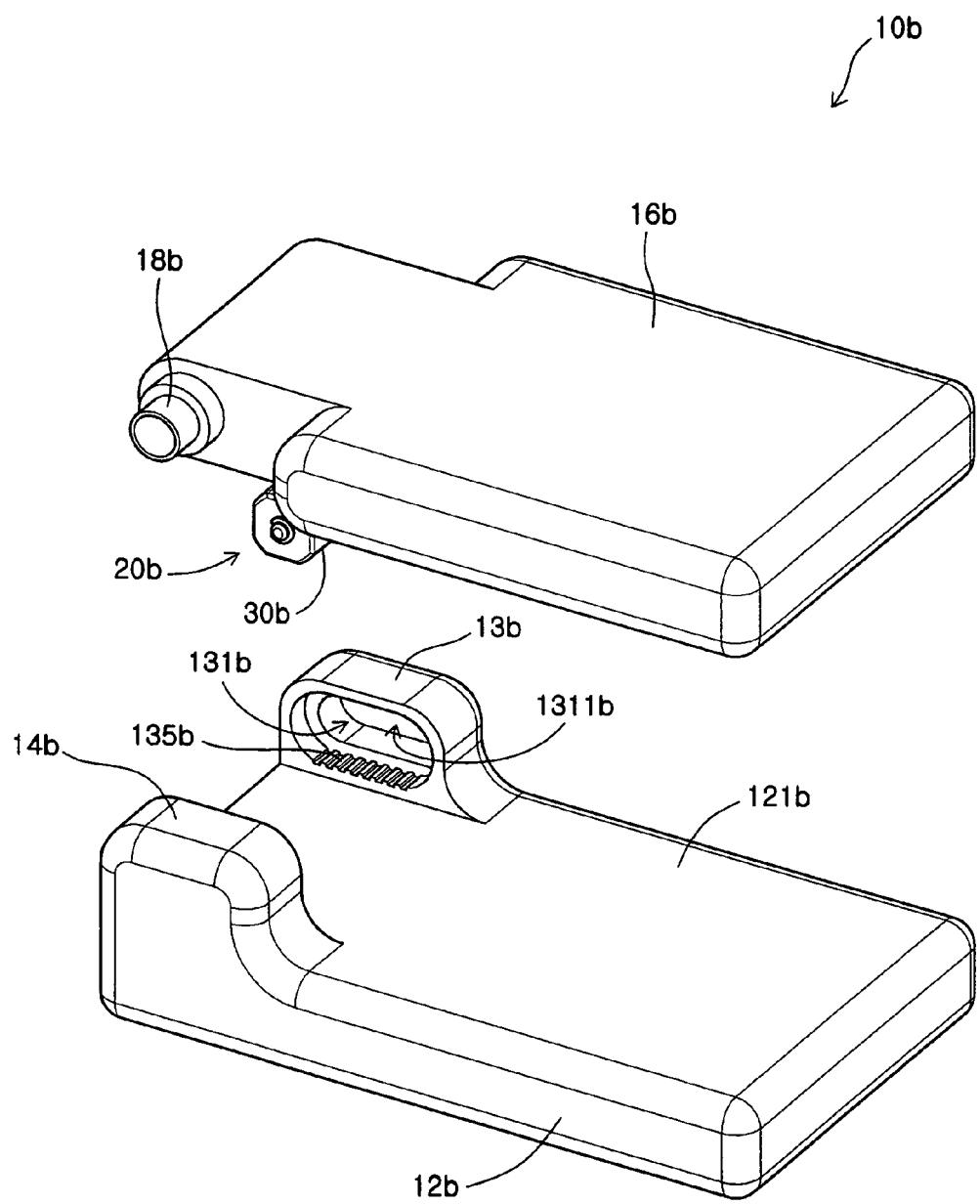
Figure 13:
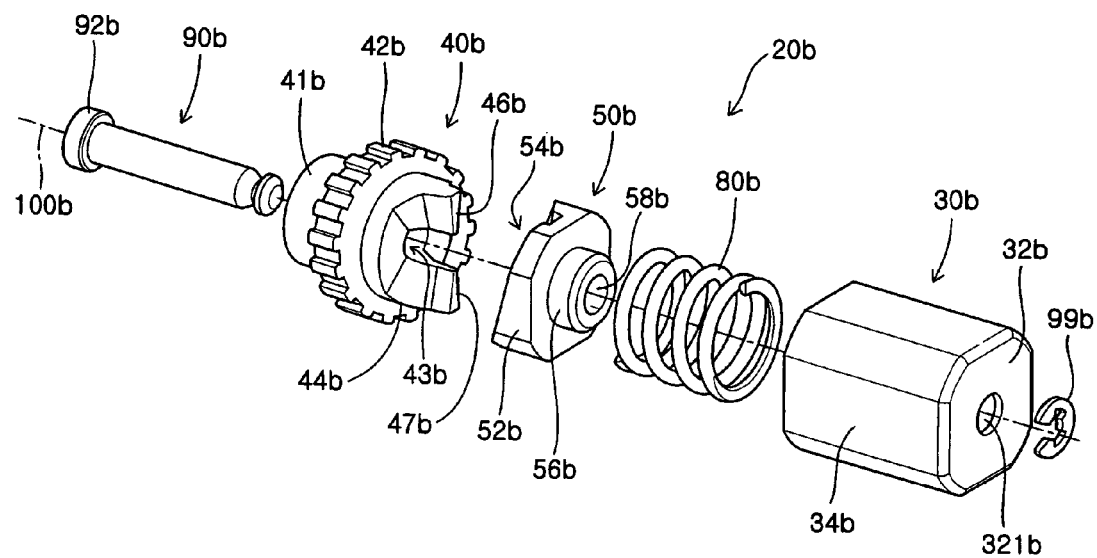
Figure 14:
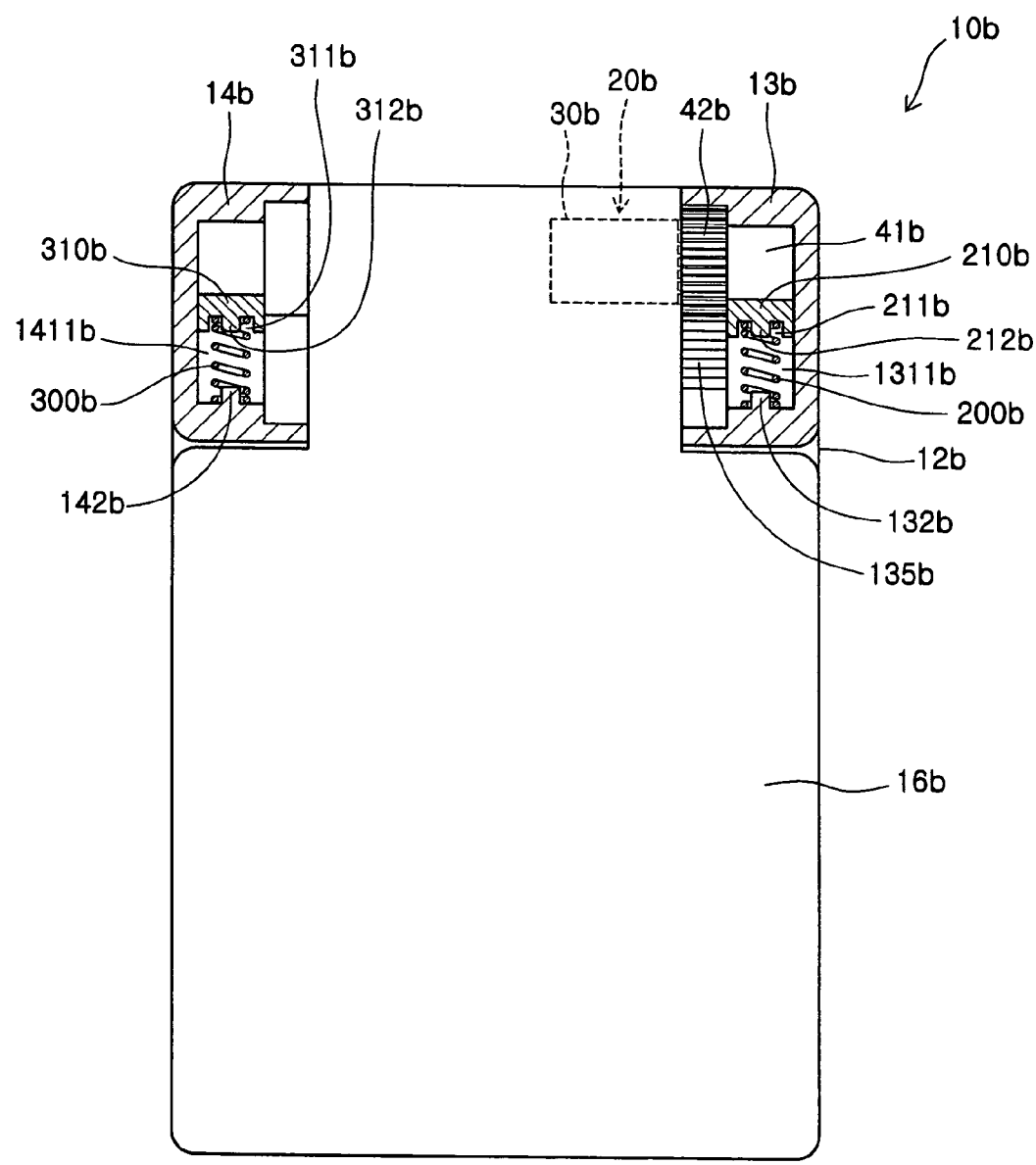
FIG. 14 is a plan view showing the interiors of first and second coupling portions of a first case unit in a state where the portable radiotelephone of FIG. 12a is assembled and completely folded, with the first and second coupling portions cut away.

FIGS. 12a to 16 are views of a portable radiotelephone 10b according to a second embodiment of the present invention. Referring to FIGS. 12a, 12b and 14, the folder-type portable radiotelephone 10b comprises a first case unit 12b provided with a liquid crystal display, a second case unit 16b provided with a keypad, and a hinge device 20b for connecting the first and second case units 12b and 16b. The first case unit 12b comprises a first coupling portion 13b and a second coupling portion 14b protruding from a reference surface 121b on which the keypad is provided. The first and second coupling portions 13b and 14b are located at both sides of one end of the reference surface 121b of the first case unit 12b. Hereinafter, the end of the reference surface 121b where the first coupling portion 13b is provided is referred to as an "upper end" and an opposite end thereof is referred to as a "lower end." The first and second coupling portions 13b and 14b are provided with first and second receiving recesses 131b and 141b that face each other, respectively. The first receiving recess 131b extends in a lengthwise direction (up and down direction) of the first case unit 12b. The interior of the first receiving recess 131b is provided with a first track 1311b extending in the lengthwise direction of the first case unit 12b. One end of the first track 1311b (an end thereof adjacent to the lower end of the first case unit 12b) is provided with a protrusion 132b around which one end of a first sub resilient member 200b to be described later is fitted. A coupling shaft 41b of a rotating member 40b of the hinge device 20b to be described later is fitted into the first track 1311b such that it can move in the lengthwise direction of the first case unit 12b. Further, the first track 1311b accommodates a first sub pressing member 210b and the first sub resilient member 200b to be described later, which urge the coupling shaft 41b of the hinge device 20b toward the upper end of the first case unit 12b. One end of the first sub pressing member 210b is in contact with the coupling shaft 41b of the hinge device 20b, and the other end thereof is in contact with one end of the first sub resilient member 200b. The end of the first sub pressing member that is in contact with the coupling shaft 41b of the hinge device 20b is formed with a concavely arcuate depression conforming to the shape of the cylindrical coupling shaft 41b. The other end of the first sub pressing member that is in contact with the first sub resilient member 200b is provided with a receiving indent 211b for receiving the end of the first sub resilient member 200b, and a protrusion 212b provided on the bottom of the receiving indent 211b to be fitted into the end of the first sub resilient member 200b. The first sub resilient member 200b is a compression coil spring. The first receiving recess 131b is provided with a rack 135b that is located outside of the first track 1311b, extends in the lengthwise direction of the first case unit 12b and cooperates with a pinion 42b of the hinge device 20b to be described later. The rack 135b is provided adjacent to the reference surface 121b to face the same side as viewed by the reference surface 121b. The second receiving recess 141b is identical with the first receiving recess 131b in their structures except that it does not have the rack 135b. A coupling post 18b of the second case unit 16b to be described later is movably fitted into a second track 1411b of the second receiving recess 141b. The second track 1411b accommodates a second sub pressing member 310b and a second sub resilient member 300b to be described later, which urge the coupling post 18b of the second case unit 16b toward the upper end of the first case unit 12b. Since the second sub pressing member 310b and the second sub resilient member 300b are identical with the first sub pressing member 210b and the first sub resilient member 200b in their structures, detailed descriptions thereof will be omitted.

The second case unit 16b comprises a mounting hole 17b in which a housing 30b of the hinge device 20b to be described later is mounted, and the coupling post 18b to be fitted into the second track 1411b of the first case unit 12b. The mounting hole 17b and the coupling post 18b are provided at both sides of an upper end of the second case unit 16b. The housing 30b of the hinge device 20b is mounted in the mounting hole 17b not to rotate with respect thereto. The coupling post 18b is in the form of a cylinder and thus can rotate when fitted into the second track 1411b of the first case unit 12b.

Referring to FIGS. 12a and 13, the hinge device 20b comprises the housing 30b, the rotating member 40b, a linearly moving member 50b, a second resilient member 80b, a coupling rod 90b, and a stopper ring 99b. The housing 30b comprises an end wall 32b, and sidewalls 34b extending along the rotation axis 100b from the end wall 32b. A side of the first housing opposite to the end wall 32b is open to form an entrance of the housing 30b. The center of the end wall 32b is provided with a through-hole 321b. A distal end of the coupling rod 90b to be described later protrudes through the through-hole 321b and is then engaged with the stopper ring 99b such as an E-ring. The sidewalls 34b are composed of a plurality of flat walls connected to one another. These flat walls function as keys when inserted and assembled into the mounting hole 17b of the second case unit 16b, thereby ensuring rotation together with the housing 30b. Further, as described later, the flat walls also function to cause the linearly moving member 50b contained in the housing to be rotated together with the housing. It is preferred that the housing 30b be made of metal (e.g., metal such as a brass plate) by means of deep drawing. Otherwise, the housing may be made through injection molding out of a plastic resin material.

Referring to FIGS. 12a and 13, the rotating member 40b comprises the pinion 42b, a cam follower portion 44b provided at the rear of the pinion 42b (hereinafter, a portion of the hinge device 20 where the opening of the housing 30b is formed is defined as a "front portion" and a portion of the hinge device where the end wall 32b is formed is defined as a "rear" portion), and the coupling shaft 41b provided in front of the pinion 42b. The pinion 42b cooperates with the rack 135b of the first case unit 12b. The coupling shaft 41b is in the form of a cylinder and is rotatably fitted into the first track 1311b of the first case unit 12b of the portable radiotelephone 10b. The cam follower portion 44b comprises the first and second cam follower protrusions 46b and 47b. The two cam follower protrusions 46b and 47b take the same shape and are arranged to be symmetric with respect to the rotation axis 100b. The two cam follower protrusions 46b and 47b extend in a direction parallel to the rotation axis 100b toward a cam surface 54b of the linearly moving member 50b to be described later. It is preferred that each of the two cam follower protrusions 46b and 47b is tapered with thickness gradually decreasing toward a rounded distal end thereof. The rotating member 40b is provided with a passage hole 43b penetrating through the center thereof along the rotation axis 100b. The coupling rod 90b passes through the passage hole 43b. Although not specifically shown in the figures, an entrance of the passage hole 43b on the side of the coupling shaft 41b is countersunk to receive a head 92b of the coupling rod 90b to be described later. The coupling shaft 41b and the pinion 42b of the rotating member 40b is located outside of the housing 30b and the two cam follower protrusions 46b are contained in the housing 30b. The rotating member 40b is rotated about the rotation axis 100b with respect to the housing 30b by means of the coupling rod 90b.

Figure 16:
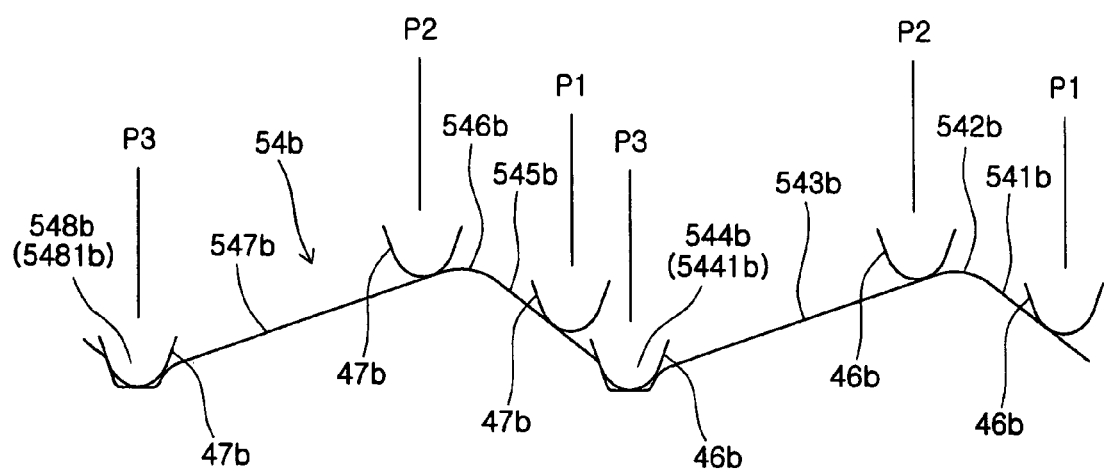
FIG. 16 is a view showing a cam surface of FIG. 13 in a deployed state together with cam follower protrusions.

Referring to FIG. 13, the linearly moving member 50b comprises sidewalls 52b, the cam portion 54b formed on a surface thereof facing the rotating member 40b, and a cylindrical boss 56b extending from the center of a reverse surface thereof opposite to the cam portion 54b. The linearly moving member 50b is provided with a through-hole 58b along the rotation axis 100b. The coupling rod 90b passes through the through-hole 58b. The sidewalls 52b are identical with the sidewalls 34b of the housing 30b in shape. The linearly moving member 50b constructed as above cannot rotate but can move linearly along the rotation axis 100b within the housing 30b. The cam portion 54b is formed circumferentially around the rotation axis 100b. A profile of the cam portion 54b is shown in FIG. 16. Referring to FIG. 16, the cam portion 54b has identical repetitive profiles at an interval of 180 degrees. The cam portion 54b sequentially comprises a first slanted surface 541b, a first peak 542b, a second slanted surface 543b, a first valley 544b, a third slanted surface 545b, a second peak 546b, a fourth slanted surface 547b, and a second valley 548b. The first and second valleys 544b and 548b are provided with insertion grooves 5441b and 5481b, respectively.

Referring back to FIG. 13, the second resilient member 80b is a compression coil spring. One side of the second resilient member is contained in the housing 30b and is in contact with the end wall 32b of the housing 30b, while the other side thereof is fitted into the boss 56b of the linearly moving member 50b to urge the linearly moving member 50b against the rotating member 40b.

Figure 15A:
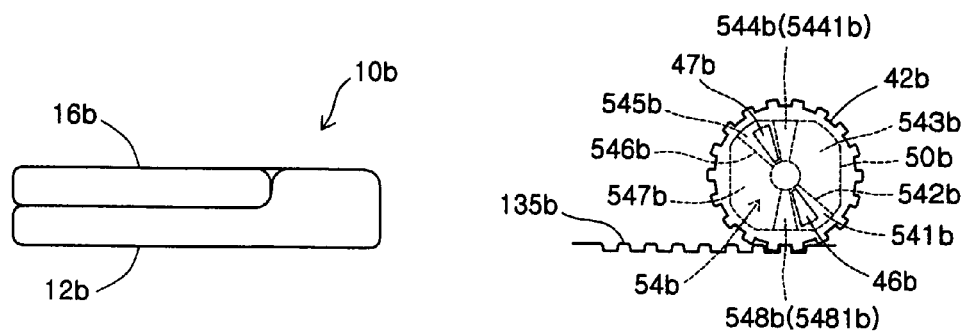
Figure 15B:
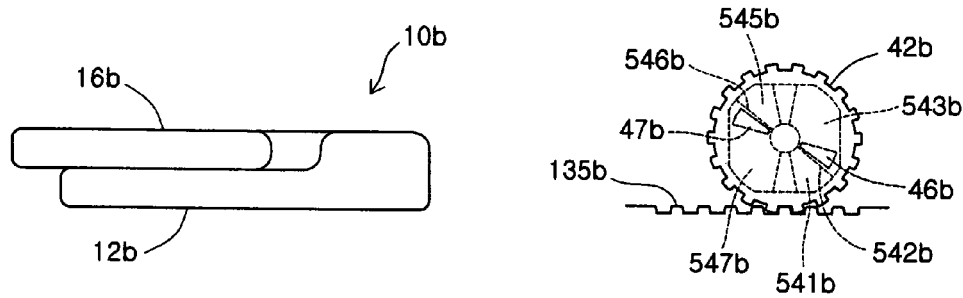
Figure 15C:
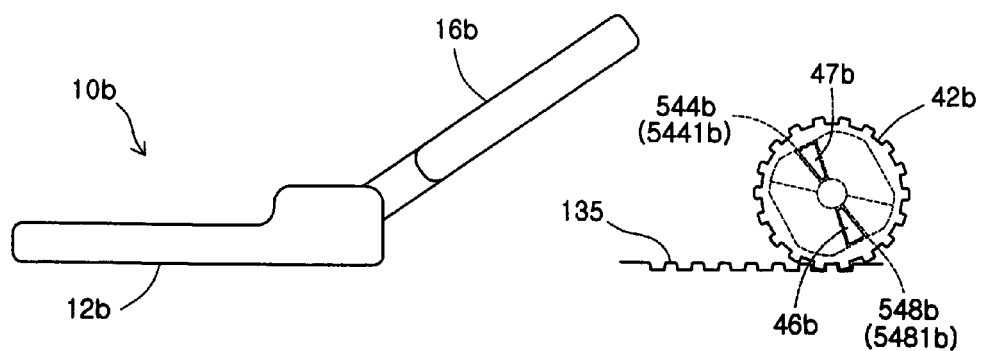

Now, the operation of this embodiment will be described in detail with reference to FIGS. 15a to 15c and 16. FIG. 15a shows the portable radiotelephone in the completely folded state and a positional relationship between the hinge device and the rack in this state. Referring to FIG. 15a, the pinion 42b of the hinge device 20b is located at a distal end of the rack while being urged by the first sub pressing member (designated by reference numeral 210b in FIG. 14). In this state, the two cam follower protrusions 46b and 47b of the hinge device 20b are located on the first and third slanted surfaces 541b and 545b of the cam portion 54b, respectively (position P1 in FIG. 16). At this time, with the cooperation of the two cam follower protrusions 46b and 47b and the cam portion 54b, the hinge device 20b functions to stably maintain the portable radiotelephone 10b in the folded state. FIG. 15b shows that the second case unit 16b is pulled toward the lower end of the first case unit 12b to be linearly moved with respect to the first case unit 12b to unfold the portable radiotelephone 10b from the above state. Referring to FIG. 15b, the pinion 42b of the hinge device 20b has been moved through rolling while cooperating with the rack 135b. During this process, the two cam follower protrusions 46b and 47b of the hinge device 20b passed over the first and second peaks 542b and 546b of the cam portion 54b and have just reached certain positions on the second and fourth slanted surfaces 543b and 547b (position P2 in FIG. 16). If a user relinquishes his/her hold of the second case unit 16b in such a state, the portable radiotelephone 10b is automatically unfolded with the cooperation of the two cam follower protrusions 46b and 47b and the cam portion 54b, and at the same time, the pinion 42b of the hinge device 20b is moved while being urged by the first sub pressing member (designated by reference numeral 210b in FIG. 13). Consequently, the portable radiotelephone 10b is in the completely unfolded state as shown in FIG. 15c. Referring to FIG. 15c, the two cam follower protrusions 46b and 47b are fitted into the first and second insertion grooves 5441b and 5481b of the cam portion 54b, respectively (position P3 in FIG. 16), thereby stably maintaining the portable radiotelephone 10b in the unfolded state.

Figure 17A:
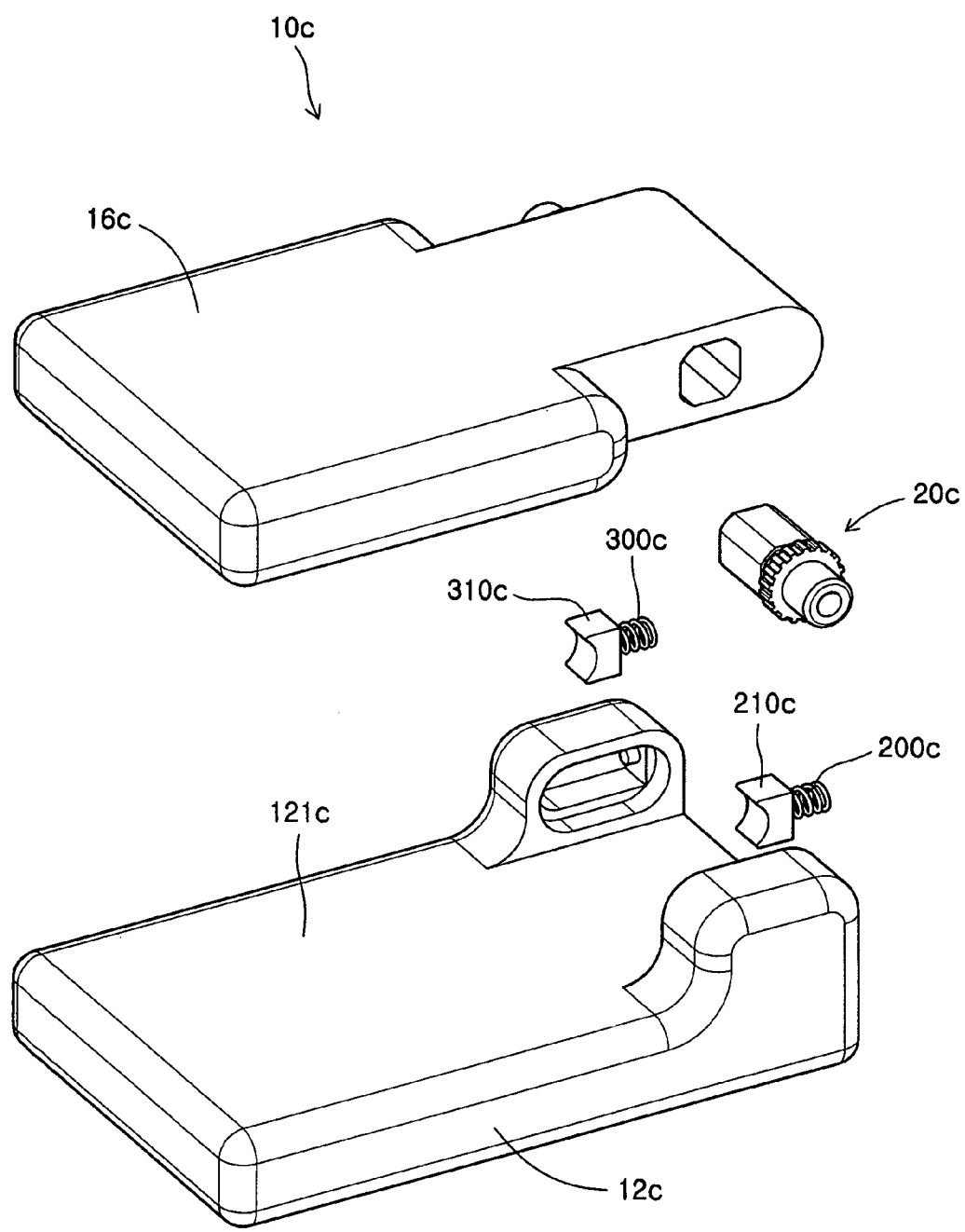
FIGS. 17a and 17b are exploded perspective views of a portable radiotelephone according to a third embodiment of the present invention.
Figure 17B:
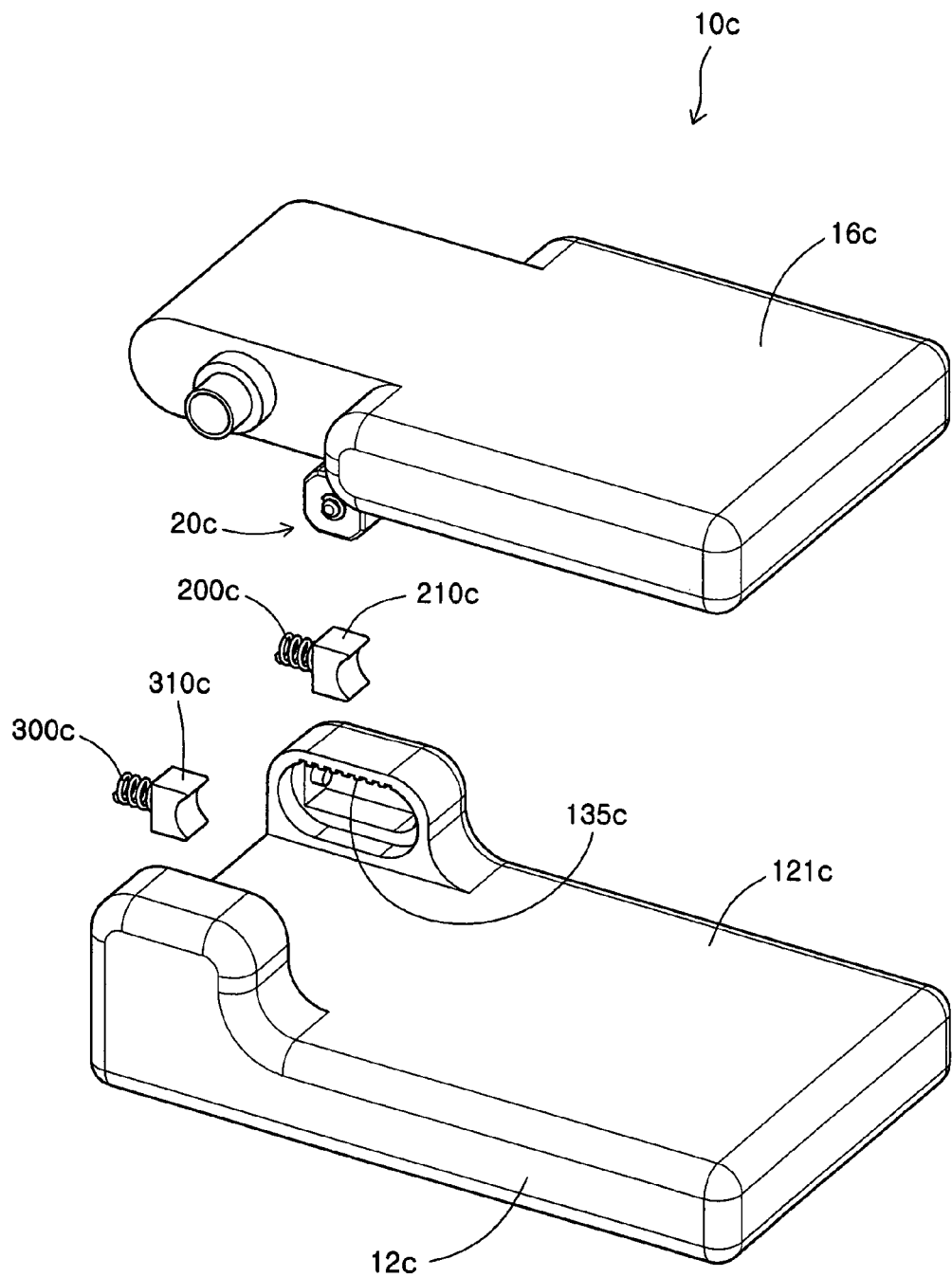
Figure 18:
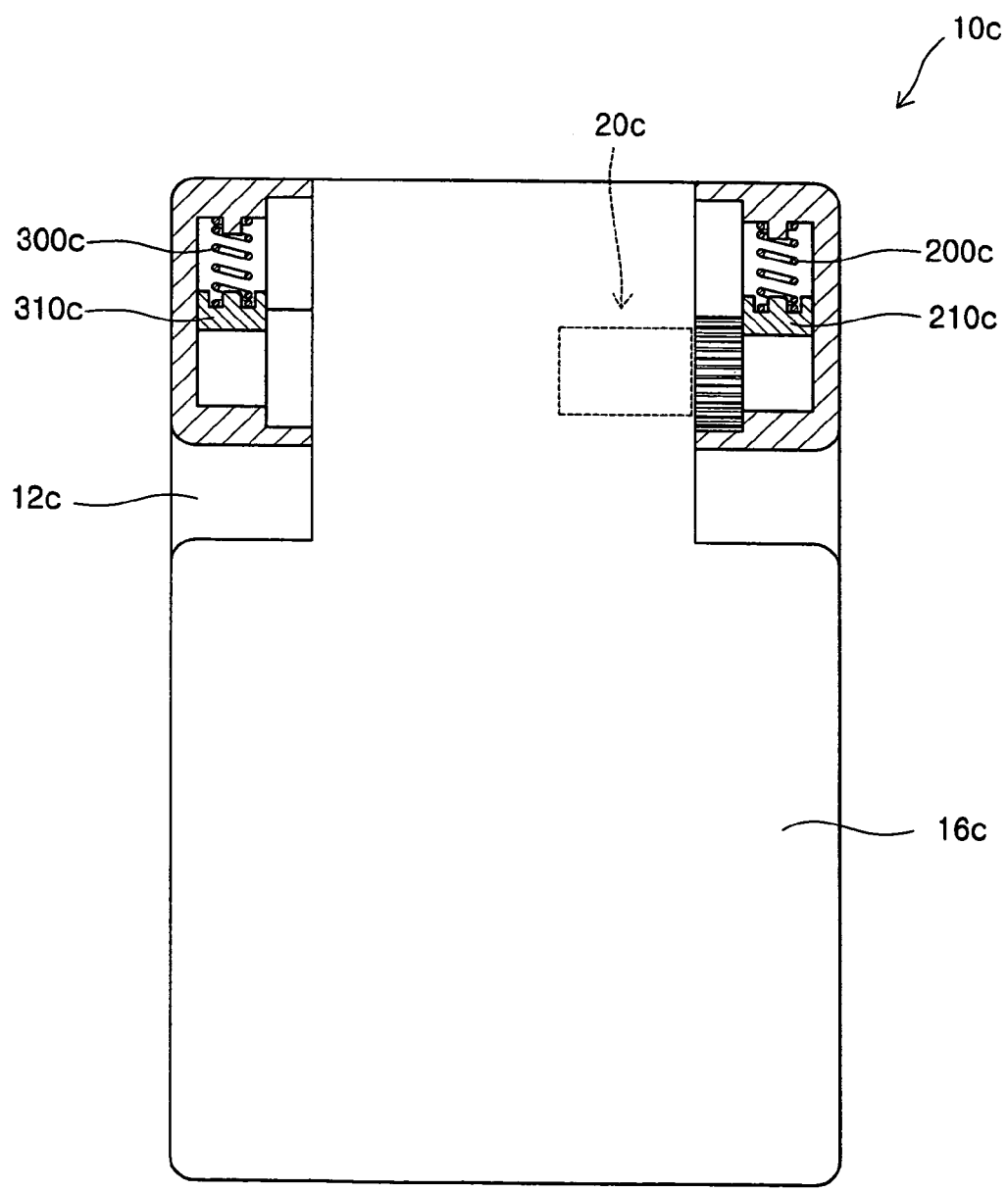
FIG. 18 is a plane view showing the interiors of first and second coupling portions of a first case unit in a state where the portable radiotelephone of FIG. 17a is assembled and completely folded, with the first and second coupling portions cut away.

FIGS. 17a to 19d are views of a portable radiotelephone 10c according to a third embodiment of the present invention. Referring to FIGS. 17a to 18, the portable radiotelephone 10c is identical with the second embodiment in their structures except that a rack 135c is provided at a side far away from a reference surface 121c to face the reference surface 121c, and first and second sub pressing members 210c and 310c and first and second sub resilient members 200c and 300c push a second case unit 16c toward a lower end of a first case unit 12c. Therefore, a detailed description thereof will be omitted.

Figure 19A:
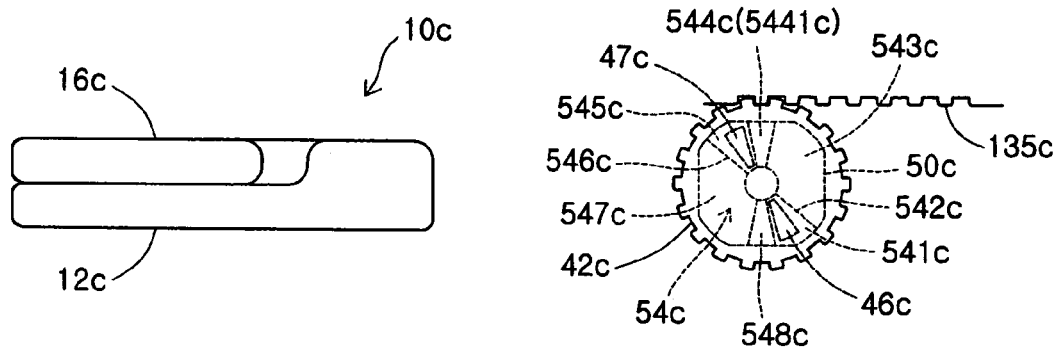
Figure 19B:
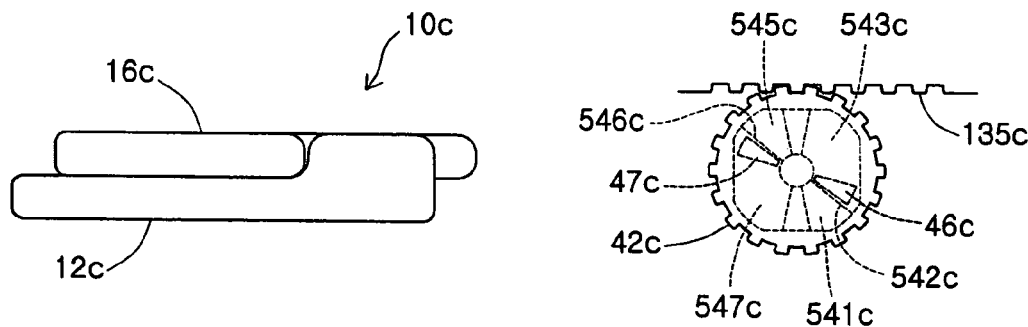
Figure 19C:
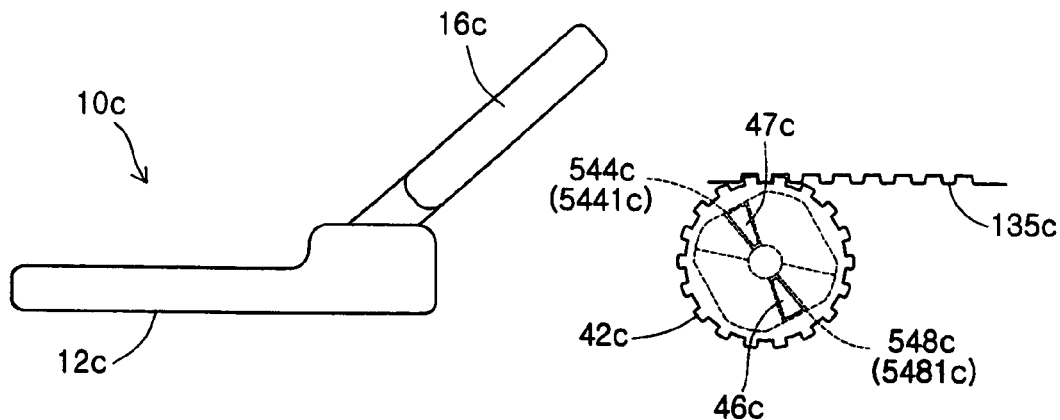

Now, the operation of the third embodiment will be described in detail with reference to FIGS. 19a to 19c. FIG. 19a shows the portable radiotelephone in the completely folded state and a positional relationship between the hinge device and the rack in this state. Referring to FIG. 19a, the pinion 42c of the hinge device 20c is located at a distal end of the rack while being urged by the first sub pressing member (designated by reference numeral 210c in FIG. 18). In this state, the two cam follower protrusions 46c and 47c of the hinge device 20c are located on the first and third slanted surfaces 541c and 545c of the cam portion 54c, respectively. At this time, with the cooperation of the two cam follower protrusions 46c and 47c and the cam portion 54c, the hinge device 20c functions to stably maintain the portable radiotelephone 10c in the folded state. FIG. 19b shows that the second case unit 16c is pushed toward the upper end of the first case unit 12c to be linearly moved with respect to the first case unit 12c to unfold the portable radiotelephone 10c from the above state. Referring to FIG. 19b, the pinion 42c of the hinge device 20c has been moved through rolling while cooperating with the rack 135c. During this process, the two cam follower protrusions 46c and 47c of the hinge device 20c passed over the first and second peaks 542c and 546c of the cam portion 54c and have just reached certain positions on the second and fourth slanted surfaces 543c and 547c. If a user relinquishes his/her hold of the second case unit 16c in such a state, the portable radiotelephone 10c is automatically unfolded with the cooperation of the two cam follower protrusions 46c and 47c and the cam portion 54c, and at the same time, the pinion 42c of the hinge device 20c is moved while being urged by the first sub pressing member (designated by reference numeral 210c in FIG. 18). Consequently, the portable radiotelephone 10c is in the completely unfolded state as shown in FIG. 19c. Referring to FIG. 19c, the two cam follower protrusions 46c and 47c are fitted into the first and second insertion grooves 5441c and 5481c of the cam portion 54c, respectively, thereby stably maintaining the portable radiotelephone 10c in the unfolded state.

Figure 20:
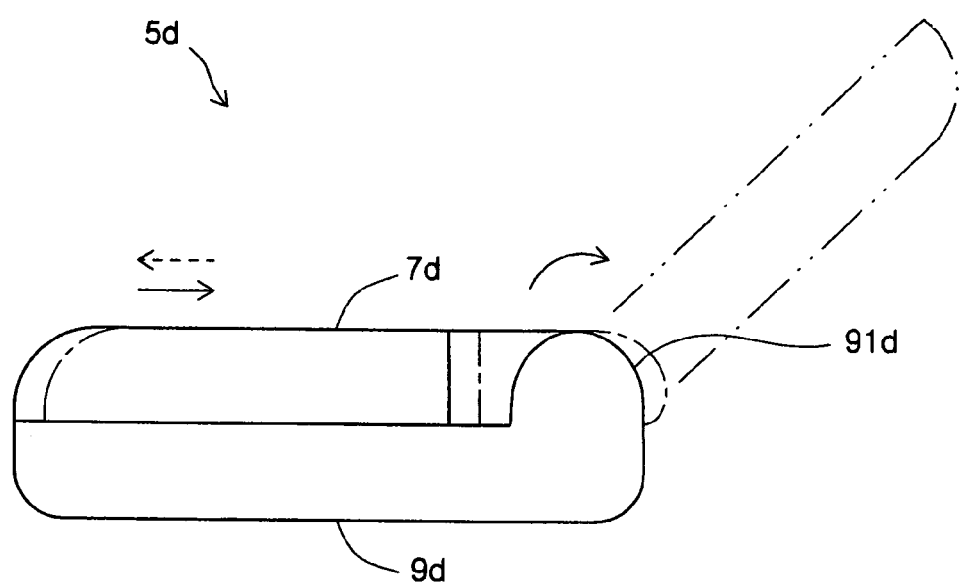
FIG. 20 is a side view of a portable radiotelephone according to a fourth embodiment of the present invention.
Figure 21:
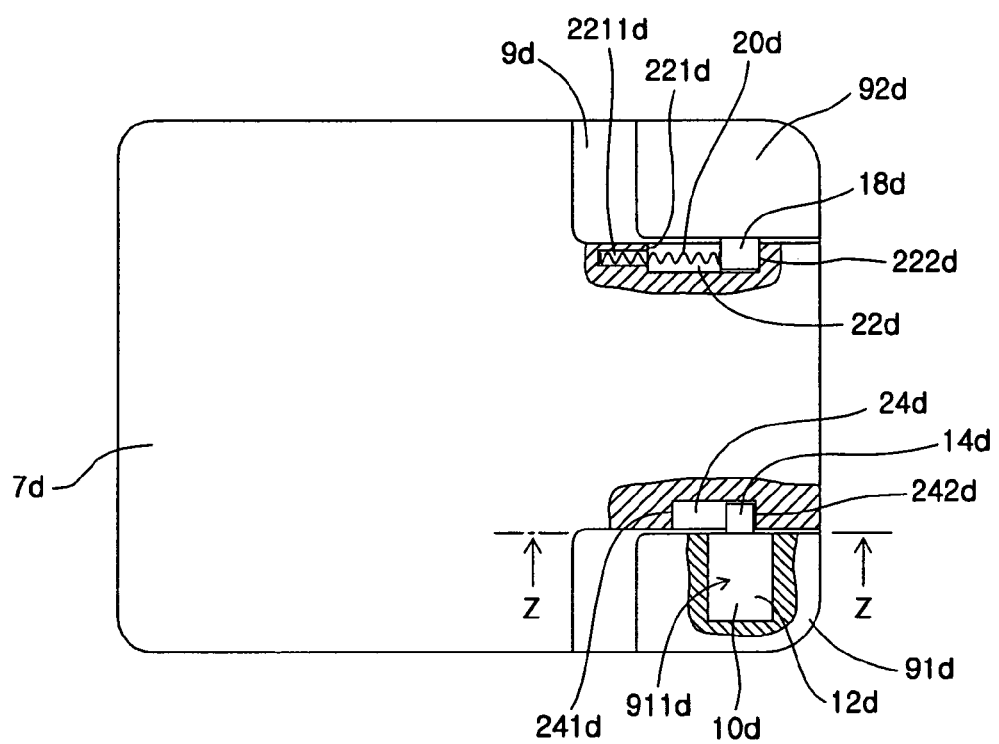
FIG. 21 is a plan view showing the interiors of coupled portions of two case units in a state where the portable radiotelephone of FIG. 20 is completely folded, with the coupled portions of the case units cut away.

FIGS. 20 to 29 are views of a portable radiotelephone 5d according to a fourth embodiment of the present invention. Referring to FIGS. 20 and 21, the portable radiotelephone 5d comprises a first case unit 7d provided with a liquid crystal display, and a second case unit 9d provided with a keypad. The first and second case units 7d and 9d are rotatably coupled to each other by means of a hinge device 10d so that they can be moved to folded and unfolded positions of the portable radiotelephone. Further, as shown in FIG. 20, when the first case unit 7d is pushed in a direction designated by a solid arrow, i.e. rightward, with respect to the second case unit 9d from a state where the portable radiotelephone 5d has been completely folded (the state represented by solid lines), the first case unit 7d is linearly moved while being slid in the direction designated by the solid arrow with respect to the second case unit 9d.

Referring to FIG. 21, both sides of the first case unit 7d are provided with a first track 24d in the form of a groove into which a coupling shaft 14d of the hinge device 10d to be described later is movably fitted, and a second track 22d in the form of a groove into which a cylindrical protrusion 18d of the second case unit 9d to be described later is movably fitted, respectively. Referring to FIGS. 20, 21, 23 and 24, the first track 24d is provided with first and second ends 241d and 242d, and first and second boundaries or interfaces 28d and 30d, which are located sequentially in the direction of linear movement (designated by the solid arrow in FIG. 20) of the first case unit 7d in the completely folded state of the portable radiotelephone 5d. The second boundary 30d of the two boundaries 28d and 30d is positioned closer to the second case unit 9d in the completely folded state of the portable radiotelephone 5d. A key plane 16d and a semicircular circumference 17d of the coupling shaft 14d of the hinge device 10d, which will be described later, are in contact with the first and second boundaries 28d and 30d, respectively. The first track 24d extends from the first end 241d in the direction of linear movement (sliding direction, or direction designated by the solid arrow in FIG. 20) of the first case unit 7d in the completely folded state of the portable radiotelephone 5d and is then bent. At this time, the first boundary 28d is bent far away from the second boundary 30d by angle A smaller than 90 degrees at a position just beyond position P and then further extends nearly by the radius of the coupling shaft 14d of the hinge device 10d. The two ends 241d and 242d of the first track 24d are arc-shaped to conform to the shape of the semicircular circumference 17d of the coupling shaft 14d of the hinge device 10d. Consequently, the boundaries of the first track 24d are composed of straight lines and arcs.

Meanwhile, in the completely folded state of the portable radiotelephone 5d shown in FIGS. 20 and 21, it is preferred that rotation axis C placed on the diametric key plane 16d of the coupling shaft 14d be located at position P that is a bent point on the first boundary 28d. The length between the first end 241d and position P in the first track 24d is determined such that, when the coupling shaft 14d of the hinge device 10d moves along the first track 24d from the completely folded state of the portable radiotelephone 5d, the coupling shaft 14d can be rotated to such an extent that the diametric key plane 16d of the coupling shaft 14d abuts a portion of the first boundary 28d between the first end 241d and position P. It will be understood by those skilled in the art that the length may be lengthened according to results of a survey for use habits or tastes of users of the portable radiotelephone. Accordingly, as described above, it will be understood by those skilled in the art that the first track 24d is constructed such that the coupling shaft 14d is rotated through a predetermined angle while moving along the first track 24d.

Referring to FIG. 21, the second track 22d is provided with first and second ends 221d and 222d located sequentially in the direction of linear movement (direction designated by the solid arrow in FIG. 20) of the first case unit 7d. The first end 221d is provided with a receiving recess 2211d. A first resilient member 20d is a compression coil spring of which one end is inserted into the receiving recess 2211d provided at the first end 221d of the second track 22d and the other end is in contact with the cylindrical protrusion 18d of the second case unit 9d. The first resilient member 20d provides a force for urging the cylindrical protrusion 18d of the second unit 9d far away from the first end 221d of the second track 22d. With this force, the portable radiotelephone 5d is stably maintained in the completely folded state that is represented by the solid lines in FIG. 20.

Figure 23:
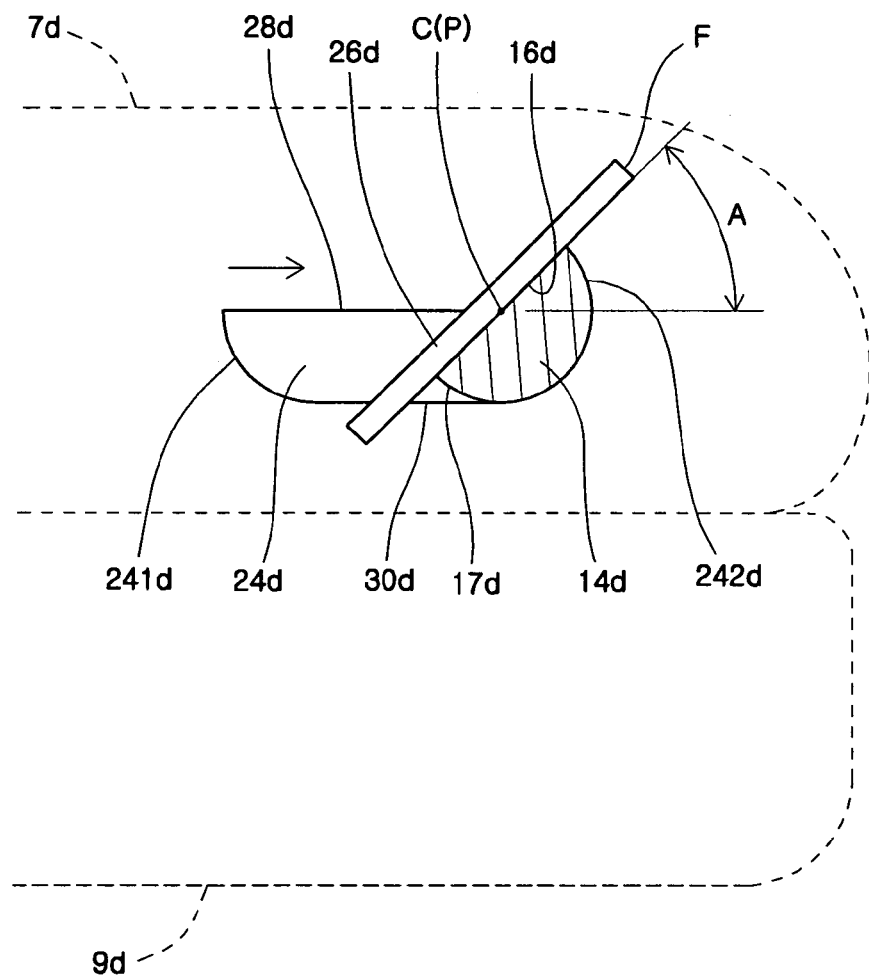
FIG. 23 is a view showing a state where a coupling shaft of the hinge device of FIG. 22 is positioned on a track provided at a first case unit of the portable radiotelephone of FIG. 20.
Figure 24:
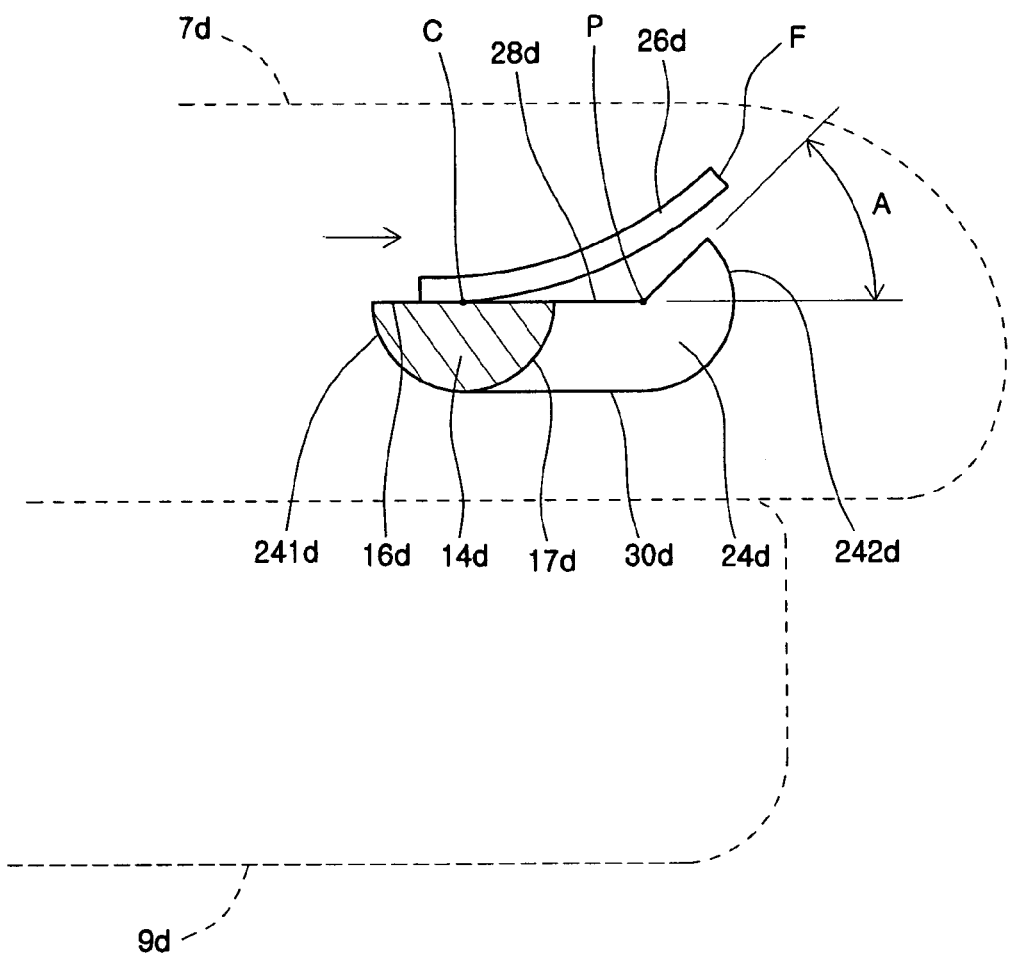
FIG. 24 is a view showing a state where the coupling shaft of the hinge device of FIG. 22 has been moved on the track provided at the first case unit of the portable radiotelephone of FIG. 20.

Although not specifically shown in the figures, referring to FIG. 23, the first case unit 7d comprises a leaf spring 26d. The leaf spring 26d is arranged such that in its initial state, it can maintain the key plane of the coupling shaft in contact with the first boundary 28d between position P and the second end 242d in the first track 24d as shown in FIG. 23. A distal end F of the leaf spring 26d, which is on the side of the second end 232d of the first track 24d, is fixed. It will be understood by those skilled in the art that the leaf spring 26d can be properly positioned to cooperate with the key plane 16d of the coupling shaft 14d of the hinge device 10d.

Referring to FIGS. 20 and 21, the second case unit 9d is provided with first and second coupling portions 91d and 92d that correspond to the first and second tracks 24d and 22d of the first case unit 7d, respectively. The first coupling portion 91d is provided with a mounting hole 911d into which a housing 12d of the hinge device 10d to be described later is inserted not to rotate. The second coupling portion 92d is provided with the cylindrical protrusion 18d to be fitted into the second track 22d of the first case unit 7d. Meanwhile, a circuit line (printed circuit line) can pass between the first and second case units 7d and 9d through the cylindrical protrusion. It will be apparent that this embodiment of the present invention can also be applied to a cosmetic compact that does not require connection by a circuit line. Alternatively, the hinge device may be mounted in the second coupling portion 92d, and accordingly, the second track 22d of the first case unit 7d may be modified to be identical with the first track 24d in configuration.

Figure 22:
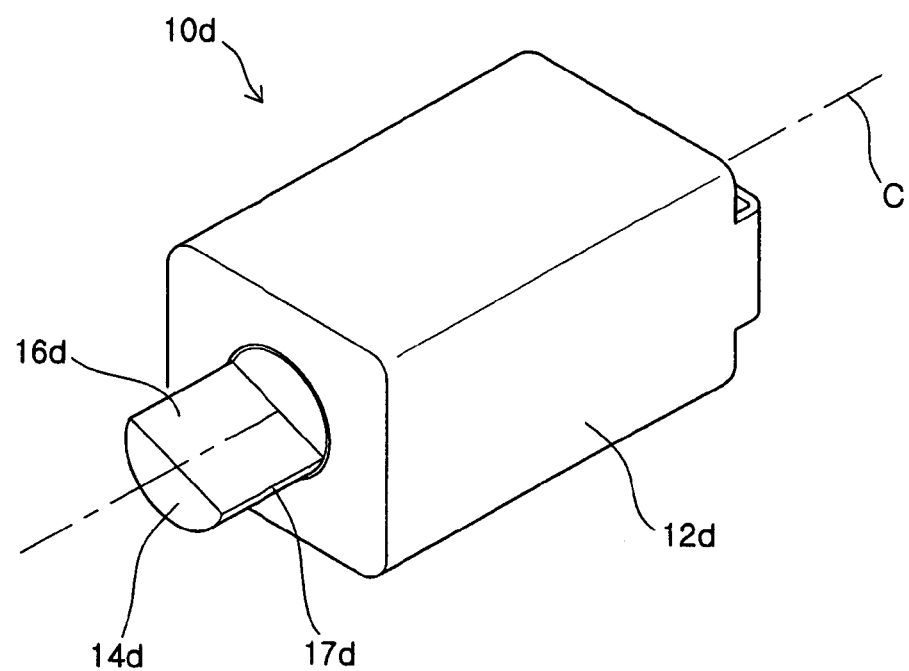
FIG. 22 is a perspective view of a hinge device used for the portable radiotelephone of FIG. 20.

Referring to FIGS. 21 and 22, the hinge device 10d comprises the housing 12d, and a rotating member, a linearly moving member and a resilient member, which are received in the case. The rotating member is provided with a cam follower portion and the linearly moving member is provided with a cam. Meanwhile, the rotating member has the coupling shaft 14d protruding outside of the housing 12d. The coupling shaft 14d protrudes in the form of a post with a semicircular cross section, along the rotation axis C of the hinge device 10d. The coupling shaft 14d has the diametrically extending key plane 16d and the semicircular circumference 17d. This example of the hinge device may have the same structure as a hinge device disclosed in Korean Patent No. 266516 (corresponding to U.S. Pat. No. 6,085,387) only except the configuration of the coupling shaft (coupling portion). Details disclosed in Korean Patent No. 266516 (corresponding to U.S. Pat. No. 6,085,387) are incorporated herein by reference. However, it will be understood by those skilled in the art that the hinge device of the present invention is not limited thereto but other typical hinge devices may be used. Further, it will be understood by those skilled in the art that the cam member (linearly moving member) with the cam and the cam follower member (rotating member) with the cam follower portion may have other constitutions. The coupling shaft 14d is inserted into the first track 24d provided in the first case unit 7d.

Figure 25:
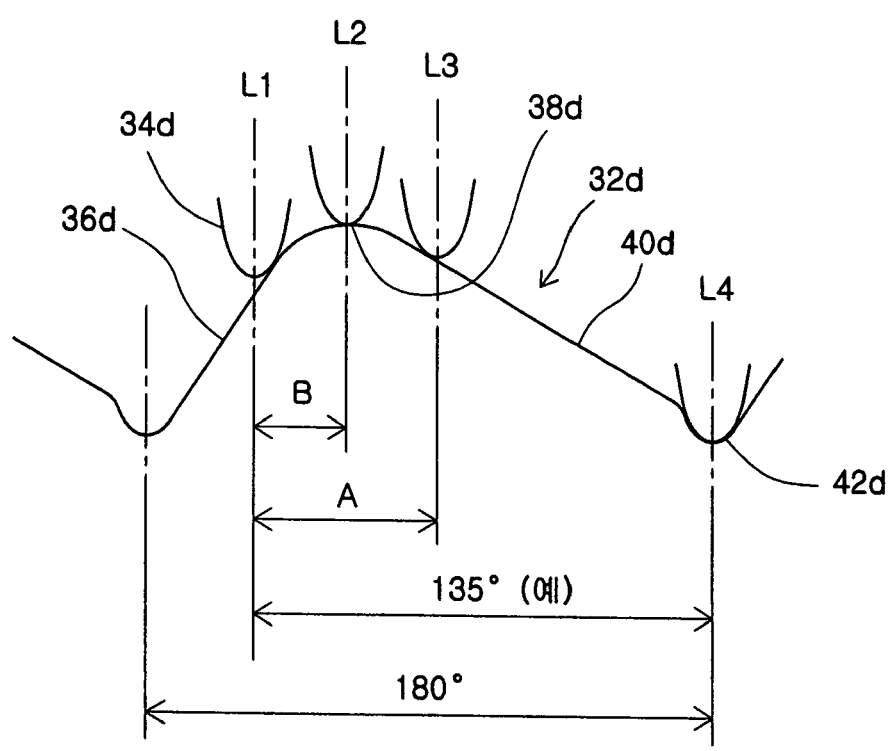
FIG. 25 is a view showing cooperation of a cam and a cam follower portion of the hinge device of FIG. 22.

FIG. 25 shows a cam 32d, which is provided on the cam member (linearly moving member) of the hinge device 10d, in a deployed state, and also shows a cam follower portion 34d of the cam follower member (rotating member) at respective moved positions. Referring to FIG. 25, the cam 32d comprises a first slanted surface 36d, a peak 38d, a second slanted surface 40d, and a valley 42d. In an initial state (a state where the two case units have been moved to the completely folded state or have been in contact with each other as shown in FIGS. 20 and 21) of the hinge device 10d, the cam follower portion 34d is located at certain position L1 on the first slanted surface 36d. When the rotating member (cam follower member) is rotated by an external force, the cam follower portion 34d ascends along the first slanted surface 36d and then reaches highest peak position L2 of the cam upon rotation thereof by angle B. When the rotating member (cam follower member) is further rotated (by an external force or automatically) by angle A, the cam follower portion 34d remains at position L3 on the second slanted surface 40d. Thereafter, even though an external force is not exerted thereon, the cam follower portion 34d descends along the second slanted surface 40d and reaches position L4 of the valley 42d by means of a force of the resilient member in the hinge device 10d. The cam follower portion 34d can move without an external force until it reaches the valley 42d. That is, the coupling shaft 34d provided on the rotating member can rotate without an external force, and thus, the first case unit can rotate with respect to the second unit so that they are spaced apart (or moved far away) from each other.

Figure 26:
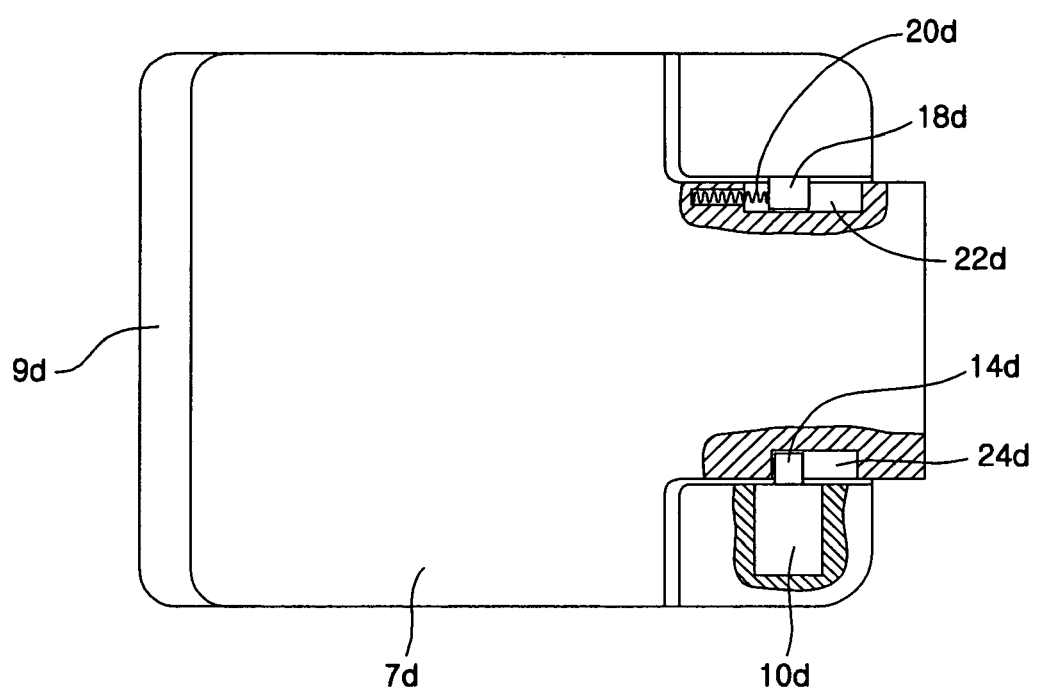
FIG. 26 is a plan view showing a state where the portable radiotelephone of FIG. 20 has been pushed in a direction designated by a solid arrow in FIG. 20.

The operation of the portable radiotelephone will be described below with reference to FIGS. 20 to 26. When the first case unit is pushed in the direction designated by the solid arrow shown in FIG. 20, the first case unit 7d is moved as shown in FIG. 26 (the moved state is represented by one-dot chain lines in FIG. 20). This corresponds to a state shown in FIGS. 24 and 26, which is obtained by moving the track 24d in a direction designated by an arrow from an initial state shown in FIG. 23. At this time, the coupling shaft 14d is rotated by angle A (larger than angle B) with respect to the housing 12d and the second case unit 9d with the housing 12d coupled thereto. Then, the cam follower portion 34d is located at position L3 shown in FIG. 25. At this time, if a user releases the force with which the first case unit has been pushed, the cam follower portion 34d descends along the second slanted surface 40d and reaches position L4 of the valley 42d even though there is no external force. At this time, the first case unit remains in the rotated state represented by a two-dot chain line in FIG. 20. During this process, the coupling shaft 14d returns to the initial position shown in FIG. 23 by means of the restoring force of the resilient member 26d.

When the user exerts a force to rotate the first unit 7d and thus fold the portable radiotelephone, the cam follower portion 34d moves from position L4 via positions L3 and L2 and is located on the first slanted surface 36d, as shown in FIG. 25. At this time, the position of the coupling shaft 14d within the track 24d is maintained in the state shown in FIG. 23. The cam follower portion 34d moves on the first slanted surface 36d even though there is no external force, so that the first and second case units 7d and 9d automatically move toward each other.

Meanwhile, it will be understood by those skilled in the art that the first and second case units 7d and 9d can be conventionally moved far away from each other by rotating the first case unit 7d through an angle beyond angle B.

Figure 27:
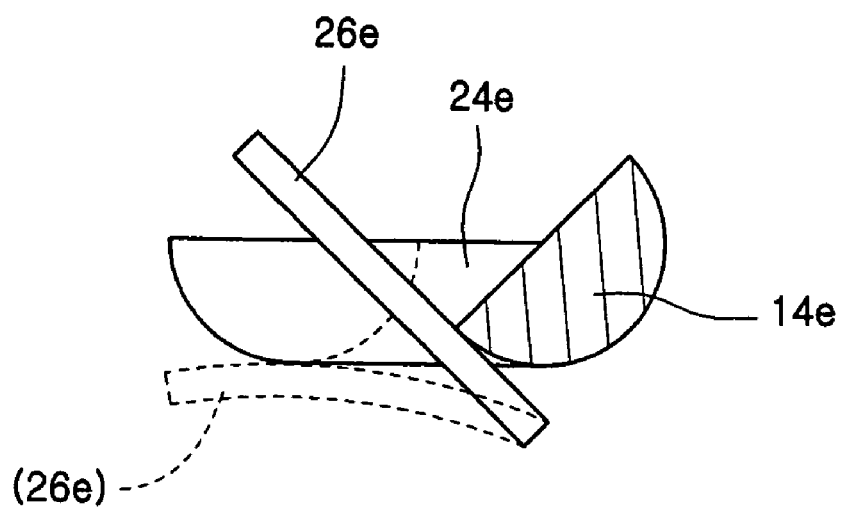
FIG. 27 is a view showing a modification in which the position of a resilient member is changed unlike FIG. 23.

FIG. 27 shows a modified version in which the position of a leaf spring 26e for returning a coupling shaft 14e to the initial position is different from that of the leaf spring of the embodiment shown in FIG. 23. Meanwhile, it will be understood by those skilled in the art that the structure for deflecting the coupling shaft to the initial position may be another resilient member such as a compression coil spring or other structures without limiting the structure of the present invention to the leaf spring.

Figure 28:
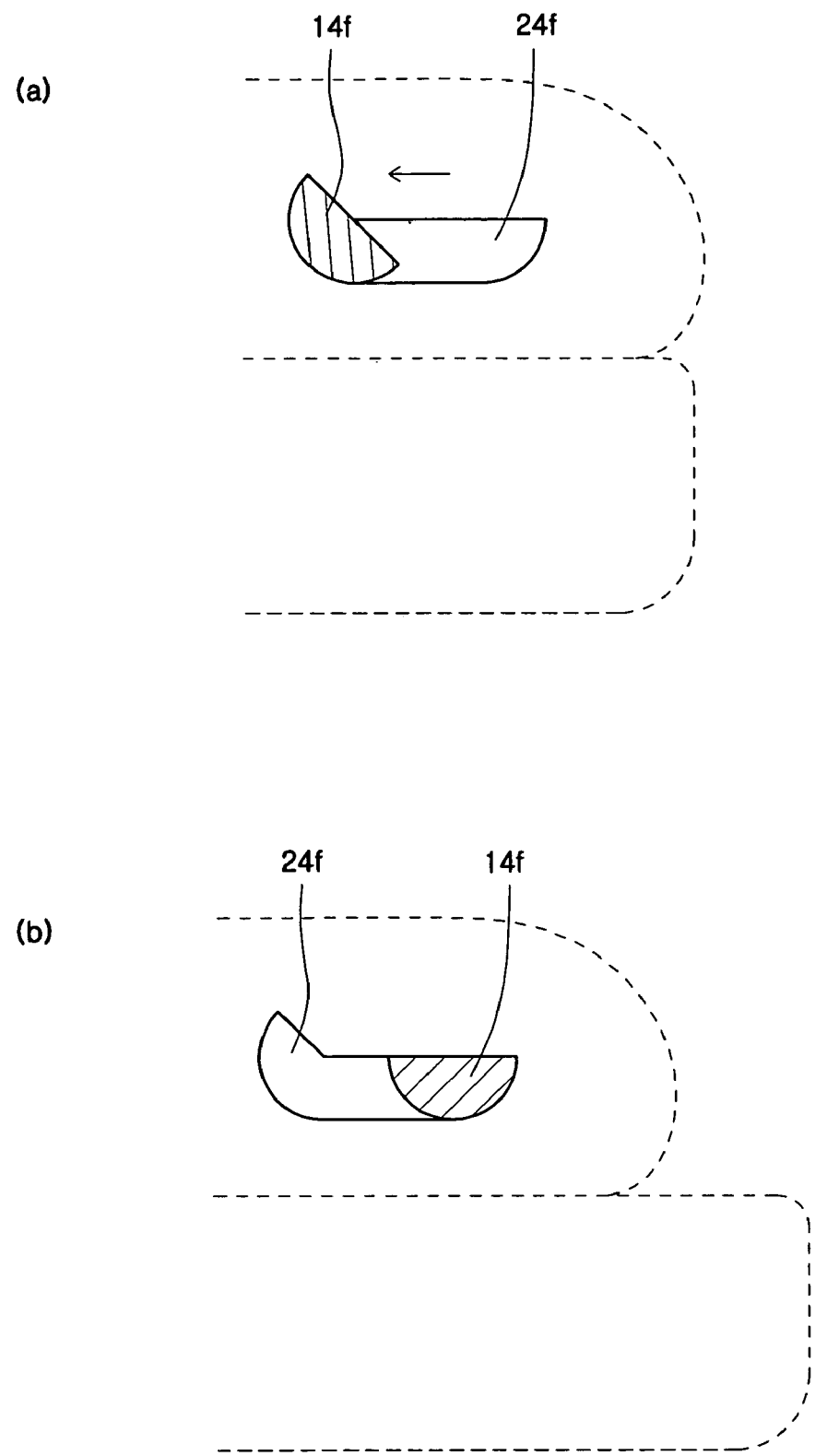
FIG. 28 is a view showing a modification in which the track provided on the first case unit and the hinge device of FIG. 22 are changed in order to change the method of operating the portable radiotelephone of FIG. 20.

FIGS. 28 (a) and (b) show another modified version in which a first case unit 7f and a second case unit can be moved far away from each other in the same manner as the previous embodiment by means of cooperation of a coupling shaft 14f and a track 24f even when the first case unit 17f is caused to move in a direction designated by a dotted arrow in FIG. 20. It will be understood by those skilled in the art that such a constitution can be established.

Figure 29:
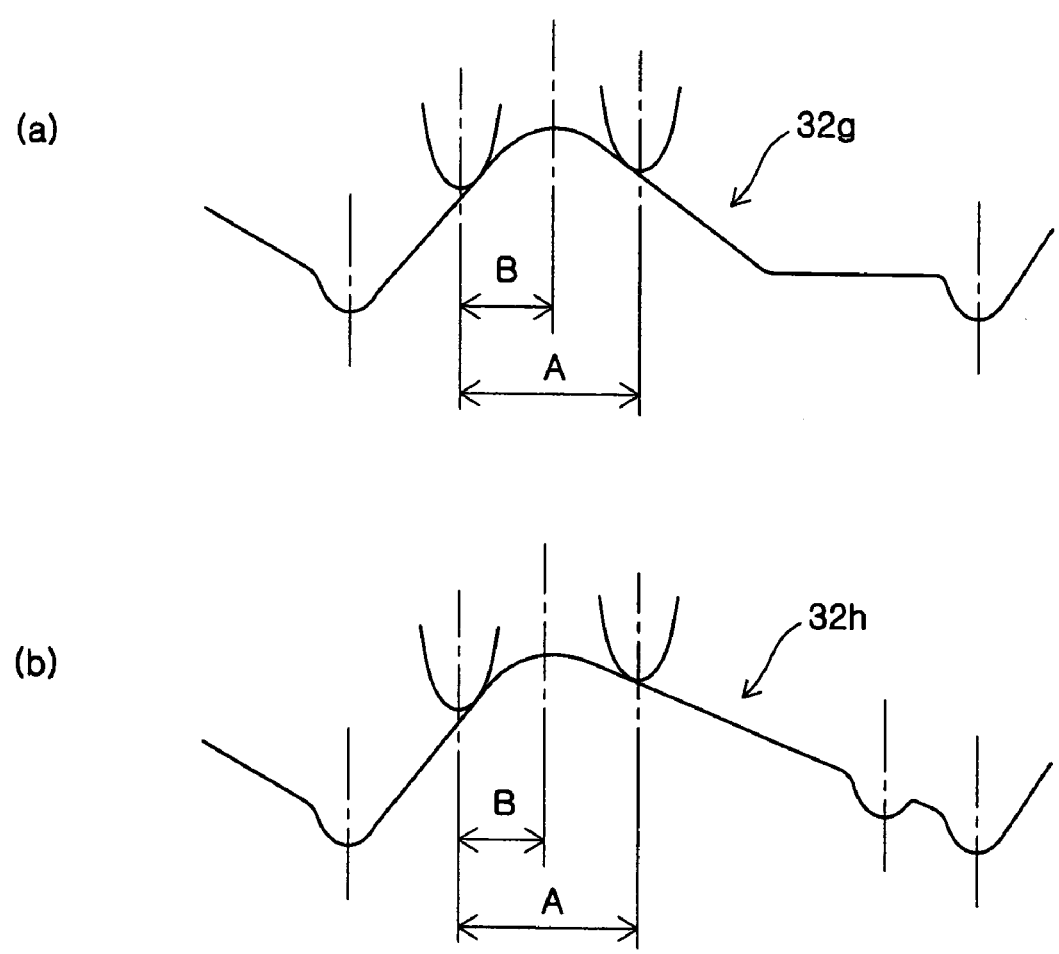
FIGS. 29 (a) and (b) are views showing a modification of the cam of the hinge device of FIG. 22.

FIGS. 29 (a) and (b) show profiles of cams 32g and 32h in modified versions.

Figure 30:
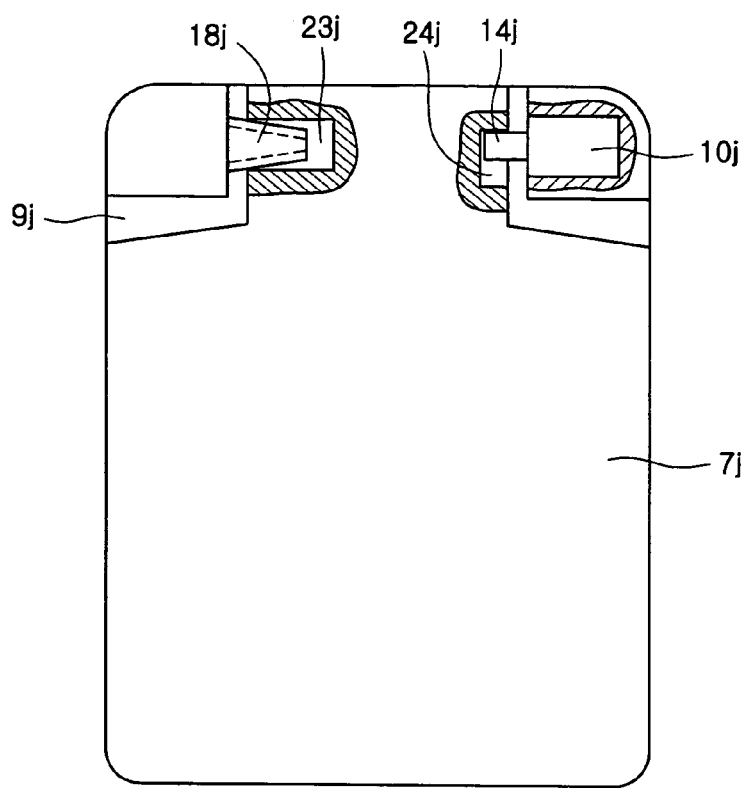
FIG. 30 is a plan view of a portable radiotelephone according to a fifth embodiment of the present invention.
Figure 31:
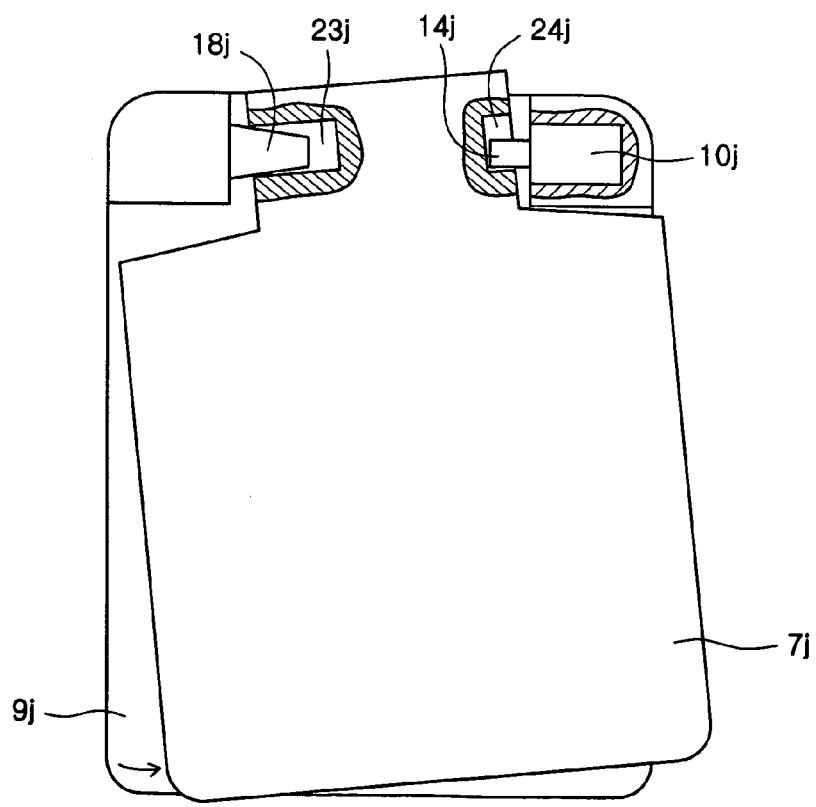
FIG. 31 is a plan view showing the operation of the portable radiotelephone of FIG. 30.

Referring to FIGS. 30 and 31, there is shown a portable radiotelephone 10j according to a fifth embodiment of the present invention. The portable radiotelephone 10j is different from the portable radiotelephone 10d of FIG. 20 in that a truncated conical protrusion 18j is formed at one side of a second case unit 9j and a cylindrical groove 23j is formed at a first case unit 7j. With such structures, as shown in FIG. 31, the first case unit 7j can be slid while rotating with respect to the second case unit 9j by pushing the first case unit 7j in a lateral direction with respect to a portion with the protrusion 18j formed therein while a state where the first and second case units 7j and 9j are in contact with each other is maintained. It will be understood by those skilled in the art that a hinge device 10j installed in the second case unit 9j can cooperate with a track 24j provided in the first case unit 7j when the track 24j has the substantially same structure as the first track 24d in the embodiment of FIG. 23.

Although the present invention has been described by way of example as being applied to a portable radiotelephone in the embodiments, it is not limited thereto. It can be understood by those skilled in the art that the present invention can be equivalently applied to other portable apparatuses (e.g., a PDA, a portable computer, a cosmetic case, and the like) each of which has two units that can be moved toward and far away from each other to fold and unfold the apparatus.

All the objects of the present invention described above can be achieved in accordance with the constitution of the present invention. Specifically, a portable radiotelephone can be conveniently used since it can be automatically unfolded by causing one of case units of the portable radiotelephone to linearly move or slidably rotate the case unit with respect to the other case unit with one hand. Further, since first and second hinge modules with first and second rotating members providing two rotation axes are inserted into and coupled to first and second mounting holes of the case unit, a hinge device can be easily assembled, thereby improving productivity thereof.

Although the present invention has been illustrated and described in connection with the preferred embodiments, it can be understood that various modifications, changes and additions can be made thereto without departing from the scope and spirit of the present invention.

What is claimed is:

1. A portable electronic or communication device, comprising: a first panel comprising a first surface; a second panel comprising a second surface; a connector connecting the first panel and second panel; wherein the connector is configured to rotatably connect the first panel and second panel relative to each other, the second panel being rotatable about a panel rotating axis between a first rotational position and a second rotational position, the first and second surfaces facing each other and being substantially parallel to each other when the second panel is in the first rotational position; wherein the connector is configured to further slidably connect the first panel and second panel relative to each other, the second panel or a portion thereof being substantially linearly movable between a first linear position and a second linear position when the second panel is in the first rotational position; and wherein the connector is further configured to actuate rotation of the second panel from the first rotational position toward the second rotational position about the panel rotating axis when the second panel or the portion thereof is in a predetermined position between the first and second linear positions, wherein the connector comprises: a cam having a cam surface, which comprises a first spontaneous moving section; a cam follower in contact with the cam surface at a contact point, the cam follower spontaneously rotatable in a first rotational direction about a hinge axis relative to the cam surface when the contact point is located on the first spontaneous moving section; wherein one of the cam and the cam follower is substantially non-rotatable relative to the second panel, and wherein the other is rotatable about the hinge axis relative to the second panel as the cam and the cam follower rotates relative to each other; and a coupler connected to the cam or the cam follower, the coupler rotatable about the hinge axis relative to the second panel as the cam and the cam follower rotate relative to each other, the coupler being substantially linearly non-movable relative to the second panel.

2. The device of claim 1, wherein the cam surface further comprises a second spontaneous moving section, wherein the cam follower is spontaneously rotatable in a second rotational direction about the hinge axis relative to the cam surface when the contact point is located on the second spontaneous moving section, and wherein the second rotational direction is substantially opposite to the first rotational direction.

3. The device of claim 1, wherein the cam surface further comprises a peak, which comprises a highest point of the peak and two sloping surfaces next to the highest point of the peak, and wherein the first spontaneous moving section comprises one of the sloping surfaces.

4. The device of claim 1, wherein the cam surface further comprises a first valley, a first peak and a second valley, and wherein the first spontaneous moving section comprises an area between the first valley and the first peak.

5. The device of claim 1, wherein when the second panel or the portion thereof is in the predetermined position, the contact point is located on the first spontaneous moving section.

6. The device of claim 1, wherein when the contact point is located on the first spontaneous section, the cam follower begins to rotate about the hinge axis in the first rotational direction relative to the cam surface.

7. The device of claim 1, wherein when the cam follower rotates about the hinge axis in the first rotational direction relative to the cam surface, the second panel begins to rotate about the panel rotating axis in a rotational direction toward the second rotational position.

8. The device of claim 1, wherein the coupler is connected to the first panel and is rotatable about the hinge axis relative to the first panel.

9. The device of claim 8, wherein the connector comprises a coupler receiver non-movably connected to the first panel, wherein the coupler receiver is configured to receive the coupler while allowing a substantially linear movement of the coupler relative to the first panel from a first coupler position to a second coupler position, and wherein the coupler and the coupler receiver are configured such that the substantially linear movement of the coupler relative to the first panel actuates rotation of the coupler about the hinge axis.

10. The device of claim 9, wherein the coupler comprises a pinion, and the coupler receiver comprises a rack engaged with the pinion.

11. The device of claim 9, wherein the coupler has a cross-sectional shape taken in a plane substantially perpendicular to the hinge axis, wherein the coupler receiver comprises a guide groove configured to receive and rotate the cross-sectional shape as the cross-sectional shape linearly moves within the guide groove.

12. The device of claim 9, wherein when the coupler is in the first coupler position, the second panel or the portion thereof is in the first linear position, and wherein when the coupler is in the second coupler position, the second panel or the portion is in the second linear position.

13. The device of claim 9, wherein the connector further comprises a spring configured to apply a force to the coupler in a direction toward the first coupler position.

14. The device of claim 9, wherein the connector is further configured to allow rotation of the second panel about a twisting axis relative to the first panel between a first twisting position and a second twisting position, wherein the twisting axis is substantially perpendicular to at least one of the first and second surfaces, wherein when the second panel is in the first twisting position, the second panel or the portion is in the first linear position, and wherein when the second panel is in the second twisting position, the second panel or the portion is in the second linear position.

15. The device of claim 14, wherein the connector further comprises a shaft projecting from one of the first and second panels, and the connector further comprises a receiving hole of a tapering rod formed in the other of the first and second panels, wherein the shaft has a distal end and a proximal end, and wherein the proximal end is thicker than the distal end in a cross-section of the shaft taken in a plane substantially parallel to the first surface when the second panel is in the first rotational position.

16. The device of claim 1, wherein the connector comprises a shaft connected to one of the first panel and the second panel, wherein the shaft is rotatable about an axis relative to the second panel and linearly movable relative to the first panel between a first shaft position and a second shaft position, and wherein the shaft is rotatable about the axis relative to the first panel and substantially linearly non-movable relative to the second panel.

17. The device of claim 16, wherein the connector further comprises a shaft receiver attached to the first panel, wherein the shaft receiver is configured to receive the shaft while allowing a substantially linear movement of the shaft relative to the second panel from the first position to the second shaft position, and wherein the shaft and the shaft receiver are configured such that the substantially linear movement of the shaft relative to the second panel actuates rotation of the shaft about the hinge axis.

18. The device of claim 1, wherein the connector comprises: a housing; a first hinge unit substantially enclosed within the housing, the first hinge unit comprising the cam, the cam follower and the coupler which is rotatable about the hinge axis relative to the housing, the coupler being substantially coupled with the first panel; a second hinge unit substantially enclosed within the housing, the second hinge unit comprising a second coupler rotatable about a second hinge axis relative to the housing, the second coupler being substantially coupled with the second panel; wherein the second coupler is rotatable about the second hinge axis relative to the housing through an angle less than about 90°.

19. The device of claim 18, wherein the angle is less than about 75°.

20. The device of claim 19, wherein the angle is less than about 50°.

21. The device of claim 18, wherein at least one of the couplers projects out of the housing.

22. The device of claim 18, wherein at least one of the couplers is enclosed within the housing and coupled with the corresponding one of the first and second panels within the housing.

23. The device of claim 18, wherein the coupler of the first hinge unit is rotatable about the hinge axis relative to the housing for an angle from less than 90° to more than 90°.

24. The device of claim 23, wherein the coupler of the first hinge unit is rotatable about the hinge axis relative to the housing for an angle from about 120° to about 200°.

25. The device of claim 18, wherein the second hinge unit comprises: a second cam having a second cam surface which comprises a valley, the valley comprising a lowest point of the valley and two sloping surfaces next to the lowest point of the valley; a second cam follower in contact with the second cam surface and being rotatable relative to the second cam surface about the second hinge axis; a resilient member applying a force to keep the second cam follower in contact with the second cam surface, the force further rotating the second cam follower about the second hinge axis relative to the cam surface when the second cam follower contacts one of the two sloping surfaces; and wherein the second coupler is connected to the second cam or the second cam follower and configured to rotate about the second hinge axis when the second cam follower and the second cam rotate about the second hinge axis relative to each other.

26. The device of claim 25, wherein the second cam follower contacts the cam surface only within the valley.

27. The device of claim 18, wherein the cam surface of the first hinge unit comprises a first valley, a first peak and a second valley;
wherein the first hinge unit further comprises a resilient member applying a force to keep the cam follower in contact with the cam surface, the force further rotating the cam follower about the hinge axis relative to the cam surface when the contact point is located between the first valley and first peak or between the first peak and the second valley.

28. The device of claim 1, wherein the first rotational position of the second panel is a closed configuration of the device, and wherein the second rotational position of the second panel is an open configuration of the device.

29. The device of claim 1, wherein at least one of the first and second panels comprises an information display screen.

30. The device of claim 1, wherein at least one of the first and second panels comprises buttons for inputting information.

31. A method of operating the portable electronic or communication device of claim 1, the method comprising: substantially linearly moving the second panel or a portion thereof relative to the first panel from the first linear position to the second linear position when the second panel is in the first rotational position; and actuating rotation of the second panel by the connector from the first rotational position to the second rotational position when the portion of the second panel is in the predetermined position.

32. The device of claim 1, wherein the predetermined position is at about the second linear position.

33. A portable electronic or communication device, comprising: a first panel comprising a first surface; a second panel comprising a second surface; a connector configured to rotatably connect the first panel and the second panel, the second panel being rotatable about an axis between a first rotational position and a second rotational position, wherein the first and second surfaces face each other and being substantially parallel to each other when the second panel is in the first rotational position; and
means for slidably connecting the first panel and the second panel, the second panel or a portion thereof substantially linearly movable between a first linear position and a second linear position when the second panel is in the first rotational position, wherein the connector comprises: a cam having a cam surface, which comprises a first spontaneous moving section; a cam follower in contact with the cam surface at a contact point, the cam follower spontaneously rotatable in a first rotational direction about a hinge axis relative to the cam surface when the contact point is located on the first spontaneous moving section; wherein one of the cam and the cam follower is substantially non-rotatable relative to the second panel, and wherein the other is rotatable about the hinge axis relative to the second panel as the cam and the cam follower rotates relative to each other; and a coupler connected to the cam or the cam follower, the coupler rotatable about the hinge axis relative to the second panel as the cam and the cam follower rotate relative to each other, the coupler being substantially linearly non-movable relative to the second panel.

34. The portable device of claim 33, wherein the connector actuates rotation of the second panel from the first rotational position toward the second rotational position when the second panel or the portion thereof is in a predetermined position between the first and second linear positions.

35. The device of claim 34, wherein the predetermined position is at about the second linear position.

36. A connector for use in connecting a first panel and a second panel of a portable electronic or communication device, the first panel having a first surface and a second panel having a second surface, the connector comprising: a connector configured to rotatably connect the first panel and the second panel so that the second panel is rotatable about an axis between a first rotational position and a second rotational position, wherein the first and second surfaces face each other and being substantially parallel to each other when the second panel is in the first rotational position; and means for slidably connecting the first and second panel so that the second panel or a portion thereof is substantially linearly movable between a first linear position and a second linear position when the second panel is in the first rotational positions, wherein the connector comprises: a cam having a cam surface, which comprises a first spontaneous moving section; a cam follower in contact with the cam surface at a contact point, the cam follower spontaneously rotatable in a first rotational direction about a hinge axis relative to the cam surface when the contact point is located on the first spontaneous moving section; wherein one of the cam and the cam follower is substantially non-rotatable relative to the second panel, and wherein the other is rotatable about the hinge axis relative to the second panel as the cam and the cam follower rotates relative to each other; and a coupler connected to the cam or the cam follower, the coupler rotatable about the hinge axis relative to the second panel as the cam and the cam follower rotate relative to each other, the coupler being substantially linearly non-movable relative to the second panel.

37. The connector of claim 36, wherein the connector actuates rotation of the second panel from the first rotational position toward the second rotational position when the second panel or the portion thereof is in a predetermined position between the first and second linear positions.

38. The device of claim 37, wherein the predetermined position is at about the second linear position.

39. A hinge device for use in a portable electronic or communication device, comprising: a housing; a first hinge unit substantially enclosed within the housing, the first hinge unit comprising a first coupler rotatable about a first hinge axis relative to the housing; a second hinge unit substantially enclosed within the housing, the second hinge unit comprising a second coupler rotatable about a second hinge axis relative to the housing; wherein the second coupler is rotatable about the second hinge axis relative to the housing for an angle less than about 90°, wherein the first hinge unit: a cam having a cam surface, which comprises a first spontaneous moving section; a cam follower in contact with the cam surface at a contact point, the cam follower spontaneously rotatable in a first rotational direction about the first hinge axis relative to the cam surface when the contact point is located on the first spontaneous moving section; wherein one of the cam and the cam follower is substantially non-rotatable relative to the housing, and wherein the other is rotatable about the hinge axis relative to the housing as the cam and the cam follower rotates relative to each other; and the first coupler connected to the cam or the cam follower, the coupler rotatable about the first hinge axis relative to the housing as the cam and the cam follower rotate relative to each other, the coupler being substantially linearly non-movable relative to the housing.

40. The hinge device of claim 39, wherein the second hinge unit comprises: a second cam having a second cam surface which comprises a valley, the valley comprising a lowest point of the valley and two sloping surfaces next to the lowest point of the valley; a second cam follower in contact with the second cam surface and rotatable relative to the second cam surface about the second hinge axis; a resilient member applying a force to keep the second cam follower in contact with the second cam surface, the force further rotating the second cam follower about the second hinge axis relative to the second cam surface when the first second cam follower contacts one of the two sloping surfaces; and wherein the second coupler is connected to the second cam or the second cam follower and configured to rotate about the second hinge axis when the second cam follower and the second cam rotate about the second hinge axis relative to each other.

41. The hinge device of claim 40, wherein the second cam follower contacts the second cam surface only within the valley.

42. The hinge device of claim 39, wherein the cam surface of the first hinge unit comprises a first valley, a first peak and a second valley;

wherein the first hinge unit further comprises a resilient member applying a force to keep the cam follower in contact with the cam surface, the force further rotating the cam follower about the hinge axis relative to the cam surface when the contact point is located between the first valley and first peak or between the first peak and the second valley.

* * * * *

UNITED STATES PATENT AND TRADEMARK OFFICE
CERTIFICATE OF CORRECTION

PATENT NO. : 7,515,707 B2 Page 1 of 1
APPLICATION NO. : 11/084433
DATED : April 7, 2009
INVENTOR(S) : Ka et al.

It is certified that error appears in the above-identified patent and that said Letters Patent is hereby corrected as shown below:

In Column 28, Line 25, Claim 36, please change "connector for" to -- connector apparatus for --.

In Column 28, Line 38, Claim 36, please change "positions," to -- position, --.

In Column 28, Line 54, Claim 37, please change "connector of" to -- connector apparatus of --.

In Column 30, Line 5, Claim 40, please change "first second" to -- second --.

Signed and Sealed this

Twentieth Day of April, 2010

David J. Kappos
*Director of the United States Patent and Trademark Office*